(12) United States Patent
Van Luchene

(10) Patent No.: US 8,221,243 B2
(45) Date of Patent: *Jul. 17, 2012

(54) SOFTWARE-BASED SYSTEM THAT MANAGES INTERACTIONS AMONG VIDEO GAME CHARACTERS

(75) Inventor: Andrew Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 178 days.

This patent is subject to a terminal disclaimer.

(21) Appl. No.: 12/782,298

(22) Filed: May 18, 2010

(65) Prior Publication Data

US 2010/0227669 A1     Sep. 9, 2010

Related U.S. Application Data

(63) Continuation-in-part of application No. 11/355,232, filed on Feb. 14, 2006, now abandoned, and a continuation-in-part of application No. 11/380,489, filed on Apr. 27, 2006, now abandoned, and a continuation-in-part of application No. 11/428,263, filed on Jun. 30, 2006, now abandoned, and a continuation-in-part of application No. 11/611,050, filed on Dec. 14, 2006, and a continuation-in-part of application No. 11/611,059, filed on Dec. 14, 2006, now Pat. No. 7,717,782, and a continuation-in-part of application No. 12/710,641, filed on Feb. 23, 2010, and a continuation-in-part of application No. 12/725,271, filed on Mar. 16, 2010.

(51) Int. Cl.
*G06F 17/00* (2006.01)
(52) U.S. Cl. ........................................................ 463/42
(58) Field of Classification Search .......... 463/9, 16–25, 463/42; 705/1
See application file for complete search history.

(56) References Cited

U.S. PATENT DOCUMENTS

| | | | |
|---|---|---|---|
| 2001/0026284 A1* | 10/2001 | Yamamoto et al. | 345/619 |
| 2003/0060248 A1* | 3/2003 | Yamashita | 463/1 |
| 2004/0224762 A1* | 11/2004 | Haga et al. | 463/33 |
| 2005/0272504 A1* | 12/2005 | Eguchi et al. | 463/40 |
| 2008/0161113 A1* | 7/2008 | Hansen et al. | 463/42 |
| 2008/0280685 A1* | 11/2008 | Hansen et al. | 463/42 |
| 2009/0011835 A1* | 1/2009 | Hansen et al. | 463/42 |

* cited by examiner

*Primary Examiner* — Ronald Laneau

(57) ABSTRACT

In an online game methods and systems disclosed herein can permit characters to give help to or offer to give help to other characters. In an embodiment, the game tracks the amount of helpfulness of each character is provided. Characters may be rewarded or paid for giving help to each other.

20 Claims, 5 Drawing Sheets

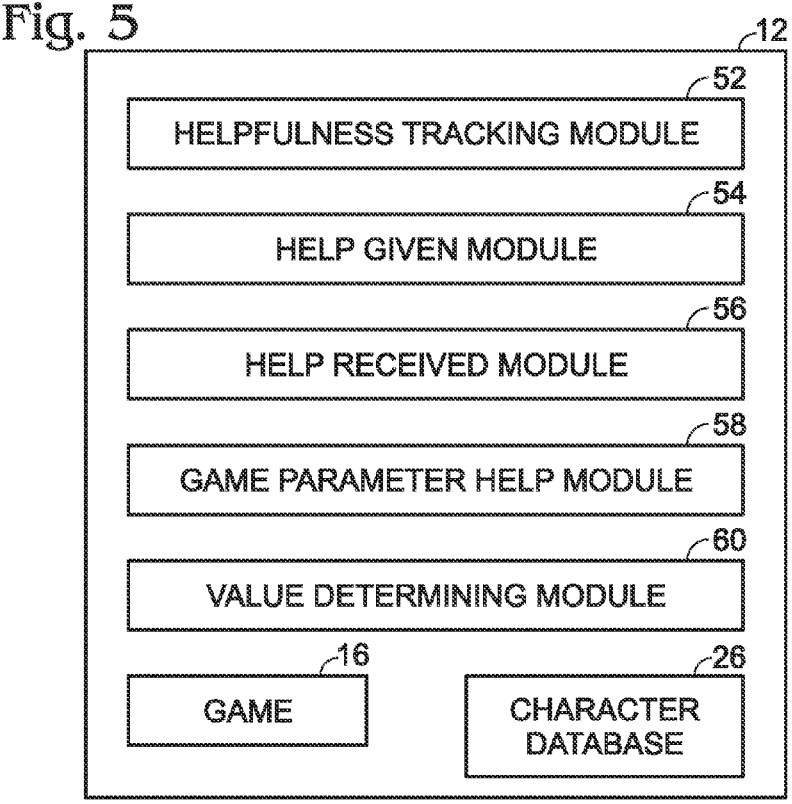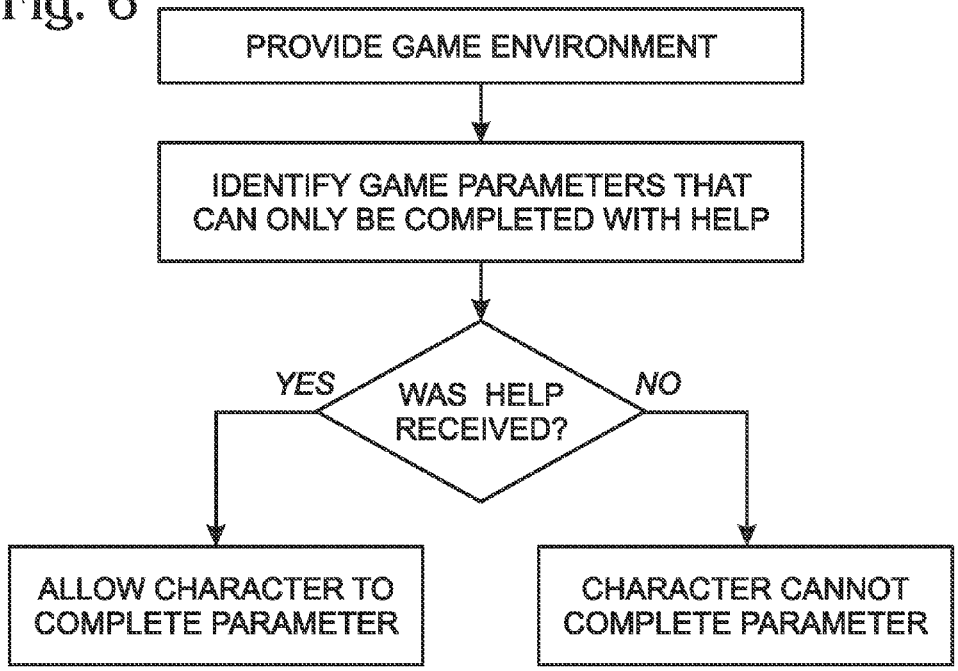

SOFTWARE-BASED SYSTEM THAT MANAGES INTERACTIONS AMONG VIDEO GAME CHARACTERS

This application is a continuation-in-part of each of the following U.S. patent applications, and each of the following applications is incorporated herein by reference:

U.S. patent application Ser. No. 11/355,232, entitled "Online Game Environment that Facilitates Binding Contracts Between Player Characters", filed Feb. 14, 2006 now abandoned;

U.S. patent application Ser. No. 11/380,489, entitled "Multiple Purchase Options for Virtual Purchases", filed Apr. 27, 2006 now abandoned;

U.S. patent application Ser. No. 11/428,263, entitled "Video Game Environment" filed Jun. 30, 2006 now abandoned;

U.S. patent application Ser. No. 11/611,050, entitled "Online Game Environment that Facilitates Sponsorship Contracts", filed Dec. 14, 2006;

U.S. patent application Ser. No. 11/611,059, entitled "Helpfulness in a virtual environment" filed Dec. 14, 2006 now U.S. Pat. No. 7,717,782;

U.S. patent application Ser. No. 12/710,641, entitled "AGREEMENTS IN VIDEO GAMES PERMITTING VIRTUAL AND REAL WORLD PENALTIES OBLIGATIONS AND REMEDIES" filed Feb. 23, 2010;

U.S. patent application Ser. No. 12/725,271, entitled "MANAGEMENT ENGINE FOR CONTRACTUAL TERMS IN A VIDEO GAME" filed Mar. 16, 2010 and U.S. patent application Ser. No. 12/754,810, entitled "APPARATUS AND METHODS FACILITATING THE USE OF FINANCIAL TRANSACTIONS IN A VIRTUAL ENVIRONMENT" filed Apr. 6, 2010.

BRIEF DESCRIPTION OF THE DRAWINGS

FIG. 5 illustrates an embodiment of a system.

FIG. 6 is a flowchart illustrating a method that, in an embodiment, may be employed by a system.

DETAILED DESCRIPTION

Figure 2:
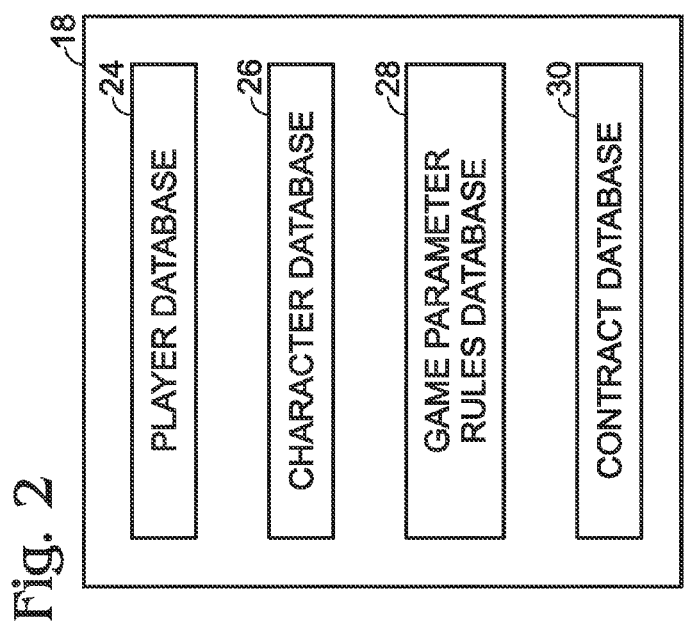
FIG. 2 illustrates databases suitable for use in a system according to an embodiment.

The following sections I-X provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise. Two or more described embodiments may or may not be mutually exclusive. The mere fact that two embodiments are described, or that two embodiments are described in proximity to each other or in conjunction with each other, does not imply that the two embodiments are mutually exclusive. A described embodiment may or may not be strictly narrower than and encompassed by another described embodiment. The mere fact that two embodiments are described, or that two embodiments are described in proximity to each other or in conjunction with each other, does not imply that one of the embodiments is strictly narrower than and encompassed by the other embodiment.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments would cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well as another example, the sentence "Examples of machines include a computer and a motor" means that one example of a machine is a computer, another example of a machine is a motor, and there may be other examples (e.g., things that are neither computers nor motors may nevertheless be a machine)

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The indefinite articles "a" and "an" and the definite article "the" refer to "one or more" of the noun modified by that article, unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the specific single feature," then the word "the" should be understood to refer to the previously mentioned "a specific single feature."

The term "plurality" means "two or more", unless expressly specified otherwise.

A "set" of things (e.g., a set of widgets) may include one or more of those things (e.g., one or more widgets), which are members of the set. Whether the set includes a particular item as a member is synonymous with whether a set includes the particular item.

A "subset" of things (e.g., a subset of widgets) may include one or more of those things. A subset does not imply that there must be in the subset fewer things than in some other set of things. A subset of a particular set may include some or all of the members of the set.

A reference to a "plurality" (and like terms such as "at least one", "one or more", "set" and the like) has inherent antecedent basis for the "number" of things included in the plurality (or in the set, etc.). For example, in the phrase "receiving a plurality of commands", there is inherent antecedent basis for "the number of commands". For example, in the phrase "receiving a set of commands", there is inherent antecedent basis for "the number of commands".

The term "herein" means "in the present application, including anything which may be incorporated by reference", unless expressly specified otherwise.

The phrase "at least one of" is equivalent to "one or more of", and when either such phrase modifies a plurality of things (such as an enumerated list of things), such phrase means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". Therefore, the phrase "based on" is equivalent to the phrase "based at least on" and is also equivalent to the phrase "based at least in part on". For example, the phrase "element A is based on element B and element C" covers embodiments where element A is calculated as the product of B times C (in other words, A=B×C) and where A is calculated as the sum of B plus C (in other words, A=B+C).

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" precedes do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "time", when used as a determined quantity, means any sort of time (e.g., time of day, day of week, date, year) on which one or more things are determined to occur.

The term "period of time" means any sort of duration (e.g., number of seconds, number of minutes, other durations) of one or more things.

The term "good" generally refers to anything which may be provided in exchange for money or other value, and thus "good" includes services, rights and items, whether tangible or intangible.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

Similarly, in the phrase "for each of the plurality of widgets, determining a respective price of the widget, a reference to "the widget" in that phrase means the "determining" step is applied to (performed for) each widget of the plurality of widgets. The phrase "the respective prices of the plurality of widgets" thus means the set which includes as members each respective price of the plurality of widgets.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers within the range, unless expressly specified otherwise. For example, the range "1 to 10" includes the integers from 1 to 10 (e.g., 1, 2, 3, 4, . . . 9, 10) and non-integers (e.g., 1.1, 1.2, . . . 1.9). A range may be denoted as non-inclusive explicitly, such as "the range of voltages from 2.5 volts to 10.3 volts exclusive", and such a range excludes 2.5 volts and excludes 10.3 volts.

A range can be continuous or discrete. For example, the range "from three meters to five meters" is a continuous range. The range "integer ranges from three meters to five meters" is a discrete range.

A range includes two ends, and each such end is, where the range is inclusive, a thing that is included in the range. Thus a range inherently has antecedent basis for the term "the ends", and has antecedent basis for the term "an end" and has antecedent basis for the terms "the first end" and "the second end". Where the range is ordered or may be ordered (e.g., a range of integers that may be ordered numerically, a range of text that may be ordered alphabetically) the range includes ends that are distinguishable because of their respective ordering. Thus a range that may be ordered has antecedent basis for terms that denote the place of the end in the ordering scheme (e.g., a range that can be numerically ordered has a "low end" and a "high end").

When used to compare values (e.g., integers, fractions) which are capable of being ordered with respect to each other, the phrase "not greater than" is equivalent to "less than or equal to". Similarly, the phrase "not less than" is equivalent to "greater than or equal to".

In reference to a plurality of things (e.g., a plurality of widgets) superlatives, where a superlative may be applied to the plurality (e.g., the largest widget of the plurality of widgets, the lowest price of the set of prices) and there is inherently antecedent basis for such superlative.

For example, for a plurality of numbers, there is inherent antecedent basis for the phrase "the greatest number of the plurality of numbers", e.g., since numbers can be ordered from least to greatest and thus the greatest number is readily and unambiguously ascertainable—the greatest number is that number of the plurality of numbers which is greater than all other numbers of the plurality of numbers. Similarly, in an embodiment where there are two equal numbers, and both numbers are greater than all other numbers in the plurality, then there are two greatest numbers.

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, heuristically "best guessing", averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. Thus, the mere usage of the ordinal number "first" does not indicate that there must be a "second". For example, the use of the phrase "a first widget" does not imply that there be a second widget. Accordingly, it would not be ambiguous or indefinite to use in a claim the term "a first widget" where no "second widget" is recited in that claim (or in any other claim it depends on). The mere usage of the ordinal number "second" or greater ordinal numbers does not indicate that there must be a "first" or any lesser ordinal number. For example, the use of the phrase "a second plurality of widgets" does not imply that there be a first plurality of widgets. Accordingly, it would not be ambiguous or indefinite to use in a claim the term "a second plurality of widgets" where no "first plurality of widgets" is recited in that claim (or in any other claim it depends on). A term which is labeled by an ordinal number is different than a term that is not modified by any ordinal number. For example, in a claim a reference to "a green widget" and a reference to "a second green widget" means that there are references to different widgets and thus there is no ambiguity as to whether the second green widget is or is not a reference to the green widget. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. (Conversely, a single computer-based device may be substituted with multiple computer-based devices operating in cooperation with one another.) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. §1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed inventions are widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims recite purposes, benefits and possible uses of the claimed invention only and do not limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g. weeks at a time). In addition, devices that are in communication with each other may communicate directly or indirectly through one or more intermediaries. Devices are in communication with one another if they are capable of one-way communication with one another. For example, a first device and a second device may be in communication with one another if the first device is capable of transmitting information to the second device, and the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the process.

A computer readable medium can be in communication with a processor such that the processor can receive some or all of the instructions stored on the computer readable medium. Likewise the processor can execute some or all of the instructions stored on the computer readable medium, and can execute different instructions at different times.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks, semiconductor memory (e.g., RAM, ROM, flash drives, semiconductor hard drives). Therefore, for example, a tangible computer-readable medium is not a carrier wave or an RF transmission.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCPorIP, TDMA, CDMA, and 3G; and/or (iv) encrypted to ensure privacy or prevent fraud in any of a variety of ways well known in the art.

A "user interface" is 'used by' a device, such as a computing device, to provide outputs to a user and to receive inputs from a user. For example, the user interface may direct the device to display (or otherwise provide) certain outputs (as defined by the user interface), and allow inputs to be received from the user via the device. In an embodiment, in order for the device to generate the user interface, the device executes certain instructions, e.g., instructions to output data and receive data as inputs. A user interface can include one or more output controls which output data and/or one or more input controls which allow data to be received. A type of input control allows a selection of an option from among a plurality of options, and may allow only one option to be selected, may allow one or more options to be selected, may allow that a predetermined number of options are selected, may allow that no options are selected. An input control may define the format of type of input that may be entered. A control may function as both an input control and as an output control.

A description of different capabilities of a user interface (e.g., by describing different embodiments of a user interface, by describing different things that a user interface can do) does not mean that in all embodiments the user interface must include all such described capabilities. On the contrary, such description also supports an embodiment in which, e.g., a user interface has only one of the described capabilities, and supports an embodiment in which a user interface has a particular combination of less than all of the described capabilities.

A description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as those described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal, from the scope of the invention, of additional, different embodiments, and similarly references to the description of embodiments which all include a particular feature do not indicate a disclaimer or disavowal of embodiments which do not include that particular feature. A clear disclaimer or disavowal in the present application will explicitly refer to the scope of the invention as disclaiming or disavowing certain subject matter and will also be prefaced by a phrase such as "does not include" or "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Conversely, the definitions and other subject matter explicitly set forth in this application should not be used to limit, define, or otherwise construe any term of any document incorporated herein by reference. Nothing explicitly set forth in this application should be interpreted as an admission or characterization of any prior art to this application.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

XI. Additional Embodiments

Unless stated to the contrary, for the purposes of the present disclosure, the following terms shall have the following definitions:

Credit Card—a credit instrument issued by a real world institution to a player that allows the player to make purchases by providing an account identifier (e.g. a credit card number) rather than cash or other currency. An example is a credit card like those issued by Visa, Mastercard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, and the like.

Real Cash Value—the value in real dollars of the obligation. This value can be determined by multiplying the financial obligation value by the then published exchange rate to real dollars.

Game Environment—an online game such as World of Warcraft or a virtual community such as Second Life.

Total virtual obligation amount—the total amount of virtual financial obligations associated with a player character account.

Virtual Contract—An enforceable agreement between a player character and either another player character or a game server. Some examples of virtual contracts are provided in U.S. Provisional Patent Application Ser. No. 60/652,036, which is hereby incorporated by reference in its entirety for all purposes.

Virtual—shall mean in a game environment or other intangible space.

Virtual Environment—an online game such as World of Warcraft or a virtual community such as Second Life.

Virtual Creditor—shall mean a first player character who is owed a virtual obligation by a second player character.

Virtual Financial Obligation—An agreement by a player character or entity to pay one or more game attributes to another player character, entity or the game server. This obligation can be a one time payment, or multiple payments over time. The obligation can specify that payments are due on virtual or real dates.

Virtual Financial Obligation Value—the in game value of the obligation. For virtual cash the value is stated as a virtual cash amount. For other game attributes, the value can be determined by generating a virtual cash market value for the item based on the current value in an online marketplace or exchange. The value of the obligation can also be set as a condition of the player contract.

Billing Information—shall mean any information pertaining to billing a player including a billing address, credit card account, bank account, pay pal account or other payment information.

Character—shall mean a persona created by a player in a video game.

Character Account—shall mean an account that tracks character attributes.

Character Attribute—shall mean any quality, trait, feature or characteristic a particular Character can have that is stored in the corresponding Character Account. Character Attributes shall include, but not be limited to: A character score A virtual object The physical appearance of a character An emblem or mark A synthetic voice Virtual money Virtual help points or credits The ability to join groups of other players at a later time A score for subsequent matching of later game parameters A relationship with another character A genetic profile or makeup Character Life—shall mean a fixed period of virtual or real world time that a player character can exist in a game environment.

Character Skills—shall mean game attributes inherent or acquired by a player character during game play such as, but not limited to: the ability to cast certain spells, foretell the future, read minds, use certain weapons, cook, hunt, find herbs, assemble herbs into potions, mine, assemble objects into other objects, fly, and/or enchant other player characters.

Computer Generated Character—shall mean any character that is generated by the system rather than being another player character.

Game Parameter—shall mean any part of a Video Game by which characters can be measured. Game Parameters shall include, but not be limited to: Completing all or part of a mission Playing for a certain period of time Winning a match against another player character or computer generated character Reaching a certain level or score using or obtaining an ability or technology kill/death ratios obtaining an object solving a puzzle accuracy with weapons effective use of the proper weapon killing a certain character/creature getting through or to a certain geographic area decreasing or increasing points for a character trait (e.g. skill level, strength, intelligence, speed, etc.) getting, buying, exchanging or learning a new skill or player attribute having a child getting married obtaining, buying, trading, producing or developing raw materials producing goods or services earning income earning a higher rank in an army winning an election among two or more player characters achieving deity status improving player character status or caste assisting other player characters with any of the above speed of accomplishing any of the above In-game Marketplace—shall mean a virtual environment where Characters can exchange Attributes.

Massive Multi Player Online Video Game—Shall mean a Video Game that is played using either a network of a Video Game Central Server and at least two Video Game Consoles or a peer-to-peer network of at least two Video Game Consoles. Players create Characters that may interact with each other in a Video Game Environment that is stored on the Video Game Central Server and the Video Game Consoles.

Novice Player—Shall mean a player that is flagged as requiring the help of an expert to complete a Game Parameter.

NPC—(non player character) a computer generated character in the game

Player—shall mean an individual who can register an account with a Video Game Central Server or within a peer-to-peer network and create Characters that can interact with other Characters in a Video Game Environment.

Player Account—Shall mean an account on the Video Game Central Server or within a peer-to-peer network that contains a Player profile including personal, billing, and character account information.

Player Attribute—shall mean any attribute that can be applied to a player account. Player Attributes shall include, but not be limited to: Real Money Discount of monthly fees for playing game Monthly fee for playing a game Global character attribute settings for all characters created by player across multiple games. Rewards for encouraging another player to signup to play Player to Player Contract—shall mean a virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—shall mean a game played on a Video Game Console that may or may not be networked to a Video Game Central Server or within a peer-to-peer network.

Video Game Console—shall mean a device comprising a CPU, memory and optional permanent storage residing at a player location that can allow for the playing of video games. Examples include home PCs, Microsoft Xbox, and Sony Playstation.

Video Game Central Server—shall mean a CPU, memory and permanent or temporary storage that is connected to multiple Video Game Consoles that allows for Massive Multi Player Online Video Games to be played.

Video Game Environment—Shall mean a virtual video game world that is stored on the combination of the Video Game Central Server and Video Game Consoles where Characters interact and games are played.

According to one or more embodiments, the present invention provides methods and systems for players to improve their progression through a video game by helping other player characters.

According to one or more embodiments of the invention, "helpfulness," that is the amount of help a given player character has provided to other player characters is a measured trait in a video game. A character's helpfulness may be measured using any suitable method including, but not limited to, those methods that have been previously used to measure other character traits (e.g. strength, health, intelligence, weapon ownership, skills, etc.) with which those of skill in the art will be familiar. For example, a game may include a running tally of help points that are associated with a particular player character. A player character's help point tally may be provided as part of the in-game display, or an item that is accessible (i.e. viewable) by a player before, during, or after game play—for example by accessing and then browsing through a game statistics menu. An in-game help point tally may be provided, for example, as a numerical figure that appears in a portion of the game screen, with or without additional information (e.g. other character trait tallies). Alternatively, an in-game help point tally may be provided in the form of a bar graph, or through the use of any other suitable indicia.

For ease of description, the present disclosure may make reference to help "points" when referring to a player character's acquisition, accumulation, or loss of helpfulness in a game. It should be understood, however, that a player's helpfulness need not be measured in terms of points or absolute values or given a numerical (or other) measurement. Other systems, such as, for example, where a player character has a certain maximum amount of helpfulness that can be accumulated and the player controlling the character is provided with an indication as to what percentage of the maximum amount of helpfulness has been accumulated (e.g. a simple bar graph that increases and decreases in length as a player character is deemed more or less helpful or gives or receives more or less help) are contemplated by the present disclosure.

According to one or more embodiments, each player character may have an account that measures the amount of help the character has given to other characters. As the game progresses, a character may accumulate help points for helping other characters in the game. For example, character X may be attempting to solve a puzzle in a game that character Y has already solved. Character Y may help character X solve the puzzle and may receive help points for doing so.

According to a first embodiment, the game system may manage, distribute and remove help points from the characters based on their actions without ramification to other players. Accordingly, in the example above, the system may pay character Y a given amount of help points without consequence to character X.

Alternatively, some or all of the help points given to a character who gives help (e.g. character Y) may be paid by (or otherwise deducted from) the character who has received the help (e.g. character X). The help points paid may be deducted from the amount of help points that a character has earned. This embodiment creates a dynamic whereby in order for a character to receive help, the character must give help. Player characters may initially be given a certain number of help points which they can use when they first start the game, or, they may be required to initially help another character before they can receive any help at all.

According to one or more embodiments, help points may be accumulated by assisting another character in completing, partially completing, or attempting to complete a game parameter. It will be understood that the type of assistance given may be dependant upon the particular game parameter that the helpee (the character receiving the help) is attempting to complete.

As non-limiting examples, assistance may be given in the form of written notes (e.g. emails or instant messages including a text-based or other form of an answer or hint); lending or giving a virtual object that solves or helps to solve a puzzle or otherwise aids the helpee in completing the parameter; and/or performing a mission with the helpee.

For example, a particular game may require that a player have collected one or more specific items, such as a key (or set of keys), before a specific door can be opened. A helper may be able to give another character help by: text messaging to the helpee the location of one or more of the keys or other instructions regarding how to obtain the key(s); giving or lending the helpee the key(s); and/or looking for the key(s) with the helpee.

According to one embodiment, a helper may only receive help points if the helpee successfully completes the game parameter. Alternatively, the number of help points given to the helper (the character providing the help) may or may not be dependant upon the degree of success by the helpee in completing the task.

Therefore, according to some embodiments, in the example above, the helper may only be given help points after the helpee successfully opens the door. Alternatively, the helper may be given help points after sending a text message with the location of one of the keys or giving the helpee the key(s), whether or not the helpee actually opens the door.

According to some embodiments, help points are associated with a particular character, not a particular player. As such, a player who controls more than one character may have the characters help each other in order to accumulate help points. Alternatively, such intra-player helping may be disallowed by some game systems.

According to one or more embodiments, the accumulation and/or possession of help points may be a prerequisite for completion of other game parameters. For example, a character may be required to have a certain number of help points in order to advance to the next or a given level in the game, gain or purchase an in-game item or attribute, or perform a certain in-game action.

According to one or more embodiments, the character who is the first to complete a particular game parameter will have right to receive payment (either in help points or in some other form) for helping others to complete the game parameter. According to a further embodiment, a given game parameter may be designed such that only a limited number of characters can complete the parameter without help. Other characters will then have to find a character that has completed the parameter without help and convince that character to give help. As a still further embodiment, the game may be designed so that if one of the characters that originally completed the parameter drops out of the game, a slot is opened up for a new character to complete the parameter without help.

According to one or more embodiments, the amount of help a player can receive before giving help to another character may be limited or may depend upon other actions, such as the amount of help the character has given. In such an embodiment, upon spending a certain number of help points by receiving help, a player may be required to give help to another character before being allowed to complete a game parameter. Alternatively or additionally, upon accumulating a certain number of help points by giving help, a player may be required to receive help before being allowed to complete a game parameter. As a further alternative, a character's success in the game (as measured, for example, by reaching increased levels, accumulation of points or items, amount of time spent in the game, puzzle solving, number of missions completed, etc.) may determine when and to/from whom the character can give or receive help.

For example, in a game in which players solve puzzles and accumulate experience points, a game may be designed such that a character can only receive help for a certain time period or for a certain number of missions before the character must give another character help in order to advance to the next experience point level. Accordingly, such games may be designed to encourage players to decide whether they want to spend their time getting help to get past certain obstacles or giving help to improve their experience point rankings.

As a still further embodiment, a particular player character or an entire player account (and all characters associated therewith) can be flagged as being required to either give or receive help for a given game parameter before a particular character (or character account) is allowed to advance to a next level.

According to one or more embodiments, giving help to a particular character may itself be a game parameter. Specifically, a game may be designed wherein at least one of the game parameters requires that help must be given to a (perhaps specific) other character in order for the game parameter to be completed. It will be understood that in this embodiment the specific other player to whom the help must be given may be controlled by the player who is controlling the helper, controlled by another player, or a non-player character NPC (e.g. a computer-controlled character). The requirement that help be given to the other character may or may not be explicitly stated to the helper.

For example, a particular game may require that a player kill a specific monster in order to advance to a next level. The game may be designed such that the only way for the player to kill the monster is by giving a certain weapon to another character so that the other character can kill the monster. As an added level of complexity, the game may not tell the player that this is how the monster must be killed.

As a further alternative, a character may only receive help points or other rewards for helping when he gives help to a specific character. For example, a player may only receive help points when he gives a player who has been designated as his "buddy" help.

According to one or more embodiments of the invention, a particular game may include a virtual marketplace in which players can find potential helpers or helpees. According to this embodiment, players may be able to post requests and/or offers for help for other players to view.

For example, a game may include a virtual marketplace in which players who are looking for help with completing a particular game parameter can post requests for help. Another player could then view and/or accept one or more requests. Alternatively, the potential helper could send the potential helpee an offer to help, which could then be accepted or rejected by the potential helpee. Once a request has been fulfilled (which, as explained above, may or may not require successful completion of the game parameter by the helpee), the helper may receive help points or other compensation.

According to a further embodiment, once a character has successfully assisted a given number of characters, the character may be given a reward in addition to the help points accumulated. For example, the character may be permitted to advance to a new level in the game. The number of characters that must be assisted by a particular helper may be defined, for example, by the game system. Alternatively or additionally, the game system may require a helper to give help in a given number of game parameters before giving the helper the additional reward.

According to a still further embodiment, characters may need to fulfill certain conditions before they can agree to accept a help request or offer help. For example, only those characters who have completed a particular game parameter may be allowed to give help to a player attempting to complete that game parameter. Alternatively or additionally, only those characters who have accumulated a certain number of experience points, time in the game, depleted their help points to a certain level or who fulfill some other requirement may be allowed to give help.

According to one or more embodiments, the number (or amount) of help points given for help with a certain game parameter may be determined using any suitable means, including, without limitation, a priori by the system, dynamically by the system, or market driven. For example, as mentioned above, a player may submit an offer of help to a player who has posted a request for help to an in-game marketplace. The offer may further include the number of help points the helpee must pay the helper in order to receive the help. Alternatively or additionally, players could post offers to help and potential helpees could contact them with a request for help and the amount of help points the helpee is willing to pay for the help. Players could then end up giving, receiving, accepting and/or rejecting help related bids.

In various embodiments help need not be paid for exclusively by help points. For example, players may agree to help each other, "I'll help you with parameter A if you help me with parameter B," trade one or more in-game items or currency for help, or may other arrangements as is suitable for the conditions of a particular game.

According to one or more embodiments, a game may include various skill levels or training that must be earned by playing the game. Characters may be able to sell or trade skills or training to other players. The skill may be offered, for example, as a module available for purchase for a certain amount or to the highest bidder. As a further embodiment, a character who purchases a skill or training may be able to sell the skill or training to another character. According to a still further embodiment, a character who initially purchases a skill (or training) and later sells the skill, may have to pay a fee, such as a percentage of the transaction, to the character from whom the skill was initially purchased.

Figure 1:
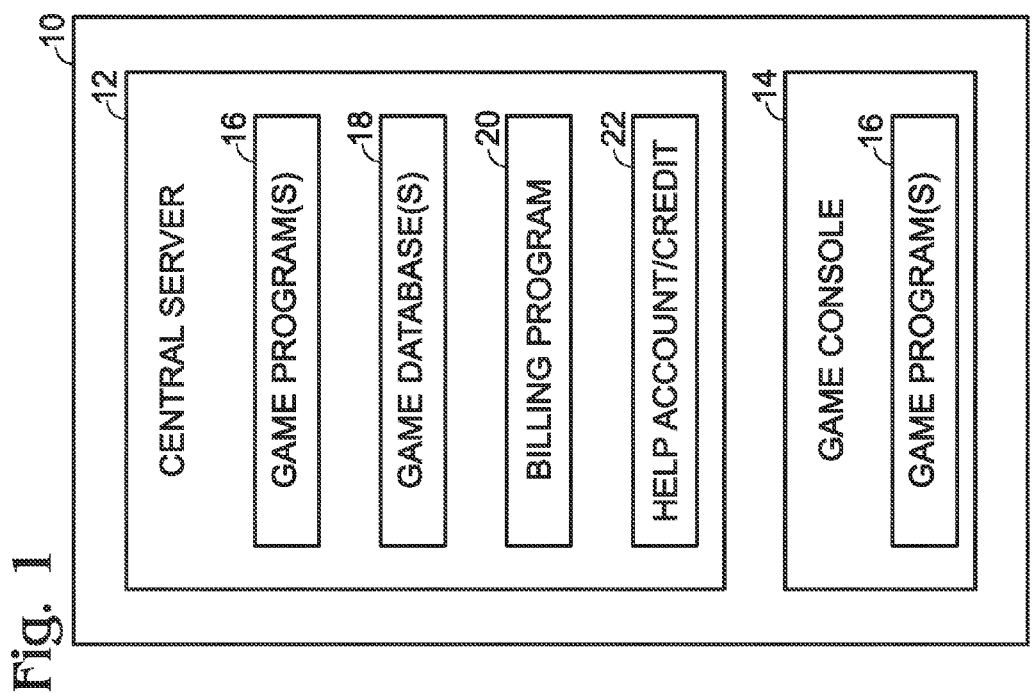
FIG. 1 illustrates a system according to an embodiment.

FIG. 1 is a block diagram of a system 10, according to one or more embodiments of the present invention. As shown, system 10 includes a central server 12 and a game console 14. Central server 12 includes several modules such as game program(s) 16, game database(s) 18, billing program 20 and help account/credit program 22. As will be appreciated, rather than residing entirely on central server 12, some or all of game program(s) 16 may instead reside on game console 14.

Turning now to FIG. 2, exemplary databases that might be included as some of the game databases 18 residing on central server 12 are shown. As shown, game databases 18 may include a player database 24, a character database 26, a game parameter rules database 28 and a contract database 30.

Player database 24 may comprise data related to the players who access and play the game. As a non-limiting example, player database 24 may link a player's unique identifier (ID) with the player's name, address, and billing information. The player's ID may further be linked to the character(s) that are under the control of the player, this information may be provided in the form of a unique identifier (character ID) associated with each character. Depending on the particular embodiment(s) of the present disclosure that are being used, the player database may further link the player with a list of game parameters and the various help that was given or received in order to complete the game parameter. The database may further link the player with a list of game parameters and an indication of whether help must be given or received by the player in order to complete the game parameter.

Player database 24 may include information about each player who accesses the game. This information may be provided to the game server by a player when the player registers to play the game, or at any other suitable time and using any suitable means. Examples of player information include, but are not limited to: player ID, player contact information, player credit card information, and/or player character ID.

Character database 26 may comprise data related to particular player characters in the game. As a non-limiting example, character database 26 may link a character's unique identifier (character ID) with game parameters that require that the character receive help in order to complete the parameter, game parameters that requires that the character give help in order to complete the parameter, and saved game results.

Player character database 26 may include information about each player character that participates, or is able to participate, in a game. Accordingly, it will be understood that according to some types of games, a single player may create and control more than one player character. Examples of information the player character database may maintain include, but are not limited to: player character ID, player character profile, player character asset(s), player character attribute(s), player character contract(s). For many of these information categories, a given player character may have multiple entries. For example, a given player character may have any number of attributes which could be tracked and maintained by the player character database.

Game parameter rules database 28 may comprise data related to the various game parameters that may be encountered in the game and the help points or credits that may be associated therewith. As a non-limiting example, game parameter rules database 28 may link a game parameter's unique identifier (game parameter ID) with a game parameter title or name, a game parameter descriptor, the amount of help points or credits that may be received for giving help to another character for that game parameter, and the help point cost associated with the game parameter, i.e. the number of help points a character must pay in order to get help with the game parameter. It should be appreciated that a particular game may be designed such that the amount of help points awarded to a player character who gives help on a given parameter may, but need not necessarily, be equivalent to the number of help points that another player character must pay in order to receive help with that parameter.

Furthermore, it should be appreciated that the amount a character must pay in order to receive help need not be equivalent to the amount of pay that is given to the character who is giving help. For example, a helpee may have to give up 100 gold pieces in order to pay a helper 10 gold pieces.

Contact database 30 may comprise data related to various contracts that may be formed between players or player characters in the game. Additional examples of player contracts are provided in co-pending U.S. patent application Ser. Nos. 11/355,232 and 11/279,991, which are hereby incorporated by reference. As a non-limiting example, contract database 30 may associate a unique contract identifier (contract ID) with a game parameter ID, the character (or player) ID of the helper, and the character (or player) ID of the helpee.

In an embodiment, a request for help as described herein can constitute, or form part of, the terms of a contract. In an embodiment, an offer to help as described herein can constitute, or form part of, the terms of a contract.

In an embodiment, a module (e.g., accessible in the video game) permits a player to specify the "completion" of a task that defines an obligation under a contract. For example, the module can provide a graphical user interface (or other interface) that lets the obligation be defined, and thus lets a player define some or all terms of a contract. For example, the user interface can allow a player to select the obligation type (e.g., "deliver an in-game item"), select what in-game item must be delivered, and select to who (e.g., to which character) it must be delivered.

Obligations can also have meta-characteristics. For example, the user interface can permit a player to select whether there is a deadline for the obligation (e.g., click the DEADLINE radio button in the user interface), and select the deadline type. For example, deadline types may include "Specific Date" (which provides the player with a calendar from which the player selects the date), "Within the next X hours of game play" (which provides a box where the player can enter a number of days/hours/minutes/seconds), "Before the occurrence of another in-game event" (which provides a user interface allowing the player to select an in-game event type), "within the next X days of the occurrence of another in-game event" (which provides a user interface allowing the player to select an in-game event type and a number of days/hours/minutes/seconds).

A similar user interface can be used to permit players to modify obligations (e.g., in a counter offer to a proposal for contract). A similar user interface can be used to permit players to modify obligations (e.g., in a counter offer to a proposal for contract). A similar user interface can be used to permit players to enter other obligations.

According to one or more embodiments, system 10 may be configured to qualify a character to give help. For example, system 10 may first retrieve a character account and determine the attributes of the character associated with the retrieved character account. The system may then identify the game parameters for which the character can give help based on the character's attributes and then flag the account as able to give help for the identified game parameters.

As a specific example, a game may be designed such that only characters who have completed a given scored game parameter with a score above a certain threshold can give help on that parameter. Having completed the parameter with a score above the threshold could then be an attribute that is associated with the character. Accordingly, system 10 may be configured to identify those characters that have that attribute (i.e. have completed the game parameter with a score higher than the threshold) and flag those character accounts as able to give help on that parameter.

According to another embodiment, system 10 may be configured to qualify a character to receive help. For example, system 10 may first retrieve a character account and determine the attributes of the character associated with the retrieved character account. The system may then identify the game parameters for which the character can receive help based on the character's attributes and then flag the account as able to receive help for the identified game parameters.

As a specific example, a game may be designed such that only characters who have given help in the last three hours of game time can receive help. Having given help in the last three hours of game time could then be an attribute that is associated with the character. Accordingly, system 10 may be configured to identify those characters that have that attribute (i.e. have given help in the last three hours of game time) and flag those characters as able to receive help. In this example, this limitation may be applicable to all game parameters in the game. Alternatively, as with the example described above with regard to qualification to give help, this, or other, limitation(s) may be applied to only one or some of the game parameters in the game.

According to yet another embodiment, system 10 may be configured to generate a help contract between two (or more) players. For example, system 10 may be configured to receive a request to give or receive help for a game parameter. The system may then output the request to an appropriate character. The system may then receive acceptance of the request and create a new contract between the character requesting to give or receive help and the player accepting the offer to give or receive help.

According to still another embodiment, system 10 may be configured to apply points and/or credits to a character account for giving help. For example, system 10 may be configured to receive an indication that help has been given to a first character from a second character. The system may then determine the help points/credits earned by the second character for giving help to the first character. The number of help points/credits earned may depend on, for example, the type of help given, the difficulty of the game parameter in which the help was given, the success of the first character in completing the game parameter after receiving the help, or other factors. The system may then apply the help points/credits earned to the second character's account.

According to a still further embodiment, system 10 may be configured to deduct help points and/or credits from a character account for receiving help. For example, system 10 may be configured to receive an indication that help has been received by a first character for a given game parameter. The system may then determine the help point/credit cost of receiving help on that game parameter and deduct the help point/credit cost from the first character's account.

According to another embodiment, system 10 may be configured to advance a character to a next level once a given threshold level of help points have been obtained by the character. For example, system 10 may be configured to retrieve a character account, determine if the account has acquired a number of help points above the threshold level, and advance the character to the next level if the required number of help points has been acquired.

According to a further embodiment, system 10 may be configured to provide virtual items or attributes to a character for giving help. For example, system 10 may be configured to receive an indication that help has been given to a first character by a second character. The system may then determine if a virtual item and/or attribute is available for the help that was given. For example, the item and/or attribute may only be available if a certain type of help was given, if the help was given for a certain parameter, or if the help was given to a certain character. If the item and/or attribute is available for the help that was given, the system may then be configured to provide to the item and/or attribute to the second character.

Another exemplary system 50 is shown in FIG. 5. The system of FIG. 5 includes a server 12 including a game 16 and a character database 26. System 50 also includes a helpfulness tracking module 52, which is configured to track a player's helpfulness through the game. Help given module 54 is configured to track and identify when a player gives help. Help received module 56 is configured to track and identify when a player receives help. Game parameter help module 58 is configured to track and identify those game parameters for which a player is allowed to give help. Game parameter help module 58 may also be configured to track and identify those game parameters for which a player is allowed to receive help. As described above, in some embodiments, characters are only allowed to give help for game parameters which they have themselves successfully completed. Accordingly, this type of information may be tracked and maintained by game parameter help module 58. System 50 may further comprise a help value determining module 60 configured to determine values for acts of helpfulness that occur in the game environment. According to some embodiments, these values may correlate to points, awards, benefits or the like which are given to the helper.

FIG. 6 is a flowchart depicting an exemplary method that may be employed by system 50. As shown, the method may include providing a virtual game environment. The game environment may allow a plurality of characters to interact with one another and may further include a plurality of game parameters that are completed by the characters as the characters progress through the game. The method may further include determining the identifying game parameters which can be completed only be receiving help from another character, and determining whether a character has received help from another character. If a character has received help, the character may then be allowed to complete the parameter. If the character has not received help, the character cannot complete the parameter.

Figure 7:
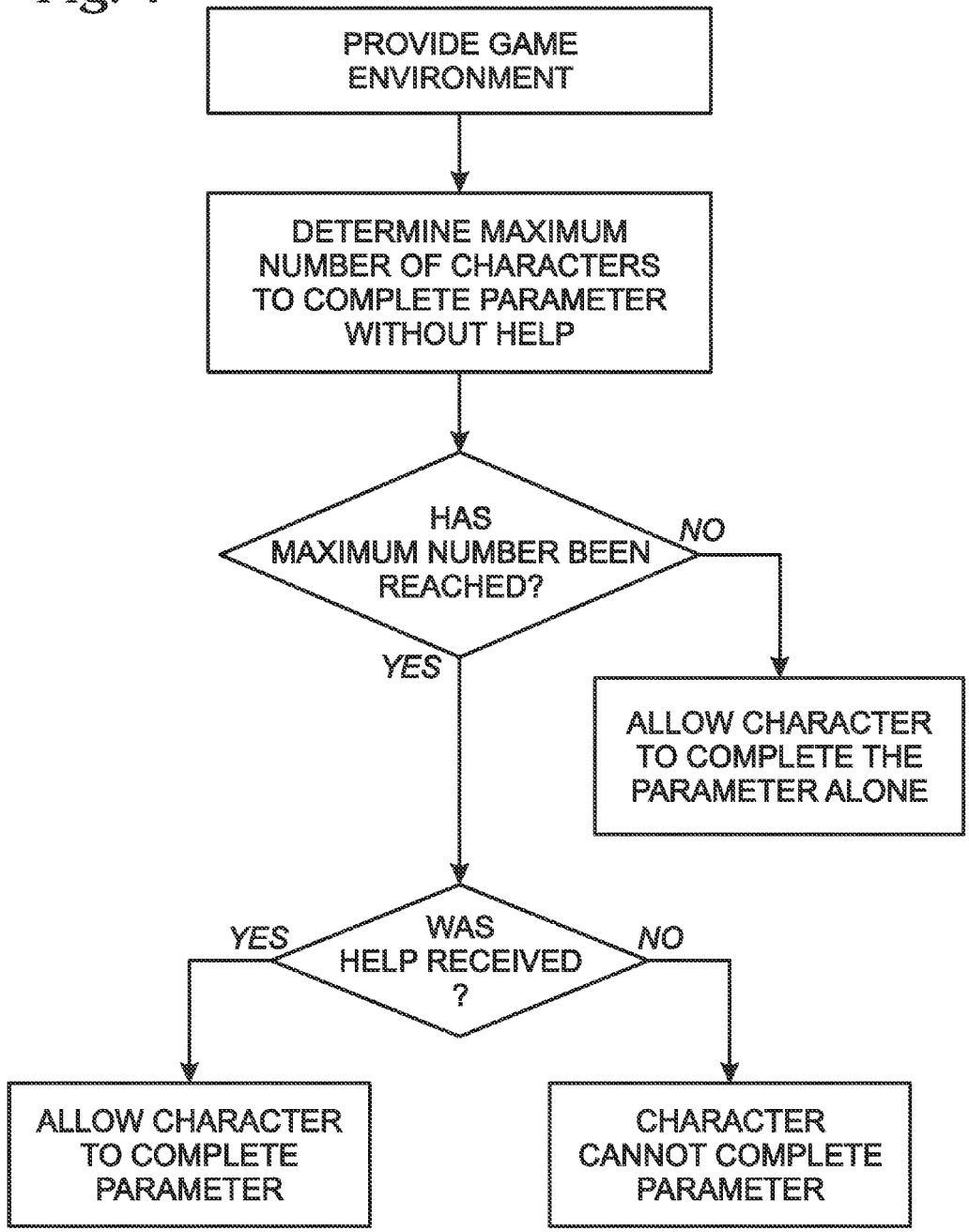
FIG. 7 is a flowchart illustrating a method that, in an embodiment, may be employed by a system.

FIG. 7 is a flowchart depicting another exemplary method that may be employed by system 50. As shown, the method may include providing a virtual game environment. The game environment may allow a plurality of characters to interact with one another and may further include a plurality of game parameters that are completed by the characters as the characters progress through the game. The method may then provide determining a maximum number of character that can complete a parameter without help and determining if the maximum number has been reached. If the maximum number has been reached, the method may determine if help was received. If help was received, the character is allowed to complete the parameter. If help was not received, the character is not allowed to complete the parameter. If the maximum number of characters who can complete the parameter without help has not been reached, the character is allowed to complete the parameter alone.

Figure 8:
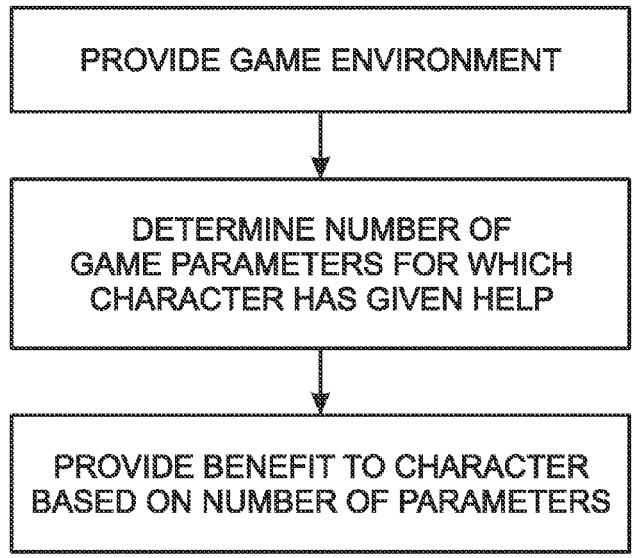
FIG. 8 is a flowchart illustrating a method that, in an embodiment, may be employed by a system.

FIG. 8 is a flowchart depicting another exemplary method that may be employed by system 50. As shown, the method may include providing a virtual game environment. The game environment may allow a plurality of characters to interact with one another and may further include a plurality of game parameters that are completed by the characters as the characters progress through the game. The method may then provide determining the number of game parameters for which a character has given help and providing a benefit based on the number of parameters.

Figure 9:
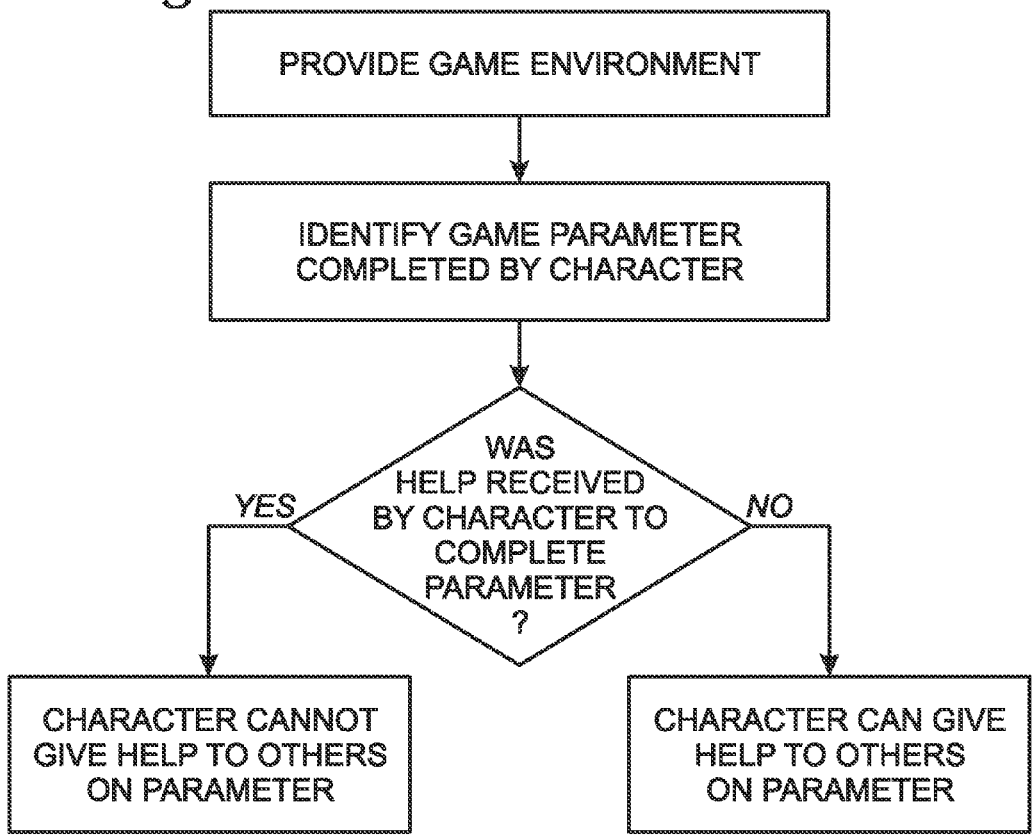
FIG. 9 is flowchart illustrating a method that, in an embodiment, may be employed by a system.

FIG. 9 is flowchart depicting another exemplary method that may be employed by system 50. As shown, the method may include providing a virtual game environment. The game environment may allow a plurality of characters to interact with one another and may further include a plurality of game parameters that are completed by the characters as the characters progress through the game. The method may then provide identifying game parameters that have been completed by a character and determining if help was received by the character to complete the parameter. If help was received, the character is prohibited from providing help to others for that parameter. If help was not received, the character is allowed to provide help to others for that parameter.

Of course it will be understood that the above methods are provided as non-limiting examples only and that various alternatives, changes and alterations may be employed. For example, various embodiments may require that a character have received help on a given parameter before that character can give help for the parameter.

Help may be passed on from one player, for example, an expert player, to another player, for example a novice player. Accordingly, one or more embodiments of the present invention provide methods and system for characters to gain expert status and be rewarded by other characters for providing help in their field of expertise. As stated above, help may take a number of different forms. One form that help may take is as advice. While the discussion below is directed primarily to those situations where the help is provided in the form of advice, it should be understood that any of the methods and systems described below may be modified for those situations where the help is provided in some other form.

Accordingly, one or more embodiments of the present invention provide methods and system for characters to gain expert status and get awarded by other characters for providing advice.

According to an embodiment, characters may be able to qualify to gain expert status for certain game parameters by, for example, having successfully completed the game parameter or having successfully completed other similar game parameters. Once a character has gained expert status for a given parameter, that character may then provide advice to other non-expert players to help them successfully complete the game parameter. For the purposes of ease of description, the character who receives advice will often be referred to as a "novice" character in the present disclosure. While it is often true that a novice character may be a character who is new to the game or who has less experience in the game than the expert, it should be appreciated that the present disclosure does not require this to be the case. Accordingly, unless specifically status to the contrary, the term "novice" should be interpreted broadly to include any character (or player), regardless of experience level, who receives help from another character (or player) and an "expert" shall be interpreted broadly to include any character (or player) regardless of experience level, who gives help to another character (or player).

According to some embodiments, a novice player can offer to contract with an expert player to receive advice about how to satisfy a given game parameter. If the expert accepts the offer, a binding and enforceable contract is created between the two characters. Examples of the use of binding and enforceable contracts in video game environments are described, for example, in co-pending U.S. patent application Ser. Nos. 11/355,232 and 11/279,991, which were incorporated by reference above. Once the parameter has been completed by the novice, the expert player is given a benefit and the novice player is given a deficit, according to the terms of the contract. Non-limiting examples of benefits and deficits are awards/payments of in-game currency, awards/deficits of point values, awards/deficits of skill levels, awards/deficits of in-game items, awards/deficits of real world currency, and/or combinations thereof.

According to one or more embodiments, a novice player may be required to qualify in order to request or receive advice. Qualification may, for example and without limitation, include: reaching a certain level in the game, acquiring a certain object, paying (e.g. for a subscription to expert services), and/or being a paying member of the game for a certain length of time.

According to one or more embodiments, a novice player who desires to receive advice may be provided with a list of experts who are able to give advice. The novice player may be able to contact, via email, an in-game instant message, a voice over IP service, etc., any one of the experts on the list. If the expert is online, the expert may be notified that a novice would like to receive advice.

According to another embodiment, novices who are seeking advice may be able to post advice requests for example, on a message board. An expert who would like to provide advice may then browse through the advice requests and choose any requests that he would like to answer.

According to another embodiment novices and/or experts may be rated. For example, once an expert works with a novice, the expert may be able to give feedback regarding the novice. This feedback may then be made available to any experts who consider providing advice to the novice. The feedback may be provided to experts in any suitable manner. For example, experts may rank a novice on a 1-10 scale for one or more characteristics such as quickness of learning, did what I asked, performed task successfully, annoying, took up too much time, etc. These rankings, or a composite thereof, may then be provided to the expert. Alternatively, experts may simply write free form or guided reviews and these reviews may be made available. Experts may then select a novice to help with the help of the rating system. Correspondingly, novices may be able to provide feedback on the experts with whom they have worked.

According to another embodiment, experts may be able to provide to the game server a list of criteria which must be fulfilled by a novice before the expert is willing to help the novice. For example, the expert may be able to identify that he will help only novices who have gained a certain feedback ranking, reached a certain level in the game, spent a certain amount of time in the game, or the like. The system may then be configured to notify the expert when an advice request has been received by a novice who fits some or all of the expert's criteria.

According to another embodiment, the system may be configured to select an expert for the novice. For example, in order to qualify as an expert, an expert must agree that he will provide help to any novice that is assigned to him by the system. Alternatively, the expert may be given the power to turn down a novice that has been suggested to him by the system.

The system may select a novice for an expert using any reasonable means. For example, the system may be configured to select a novice by matching a specific request for advice submitted by a novice with a particular expert's field of expertise. Other factors such as whether the expert is online at the time the novice requests the advice may also be considered. Other mechanisms by which expert-novice pairings may be created include: basing the pairing on previous play by the expert (for example, an given expert may be assigned to provide advice each time a certain scenario or event unfolds in the game for which the expert has provided effective advice in the past and/or for which the expert has been highly rated), assigning the pairing at random, or basing the pairing on certain events. Suitable events include, for example, a new character joining the game (e.g. every new player gets an expert coach the first X hours/minutes/days of play), or completing a new game parameter (e.g. each time a character attains a new game level, new character class, or new ability, the character gets an expert coach).

According to one or more embodiments of the present invention, an expert may give advice on a completely voluntary basis. In such a case, a player may simply choose to become an expert when, and only if, he wants. However, a particular game may be designed such that players may need to volunteer to be an expert in order to gain certain advantages in the game, such as, for example, advancement to a new level, attainment of certain items, or attainment of certain skills.

According to one or more embodiments, a player or character may have to qualify to become an expert. For example, a player may be able to become an expert when any of his characters reach a certain experience level. Alternatively, a player may only be allowed to gain expert status when an aggregate of all experience of all characters in that player's account have reached a certain level. Moreover, qualification may be based on factors other than experience, such as ranking in the game, or other player's ratings of the player.

According to an embodiment, a player may be notified when he has qualified to be an expert. The game may offer the player the opportunity to be an expert by, for example, presenting a screen or pop-up window to the player presenting an offer to become an expert. Alternatively, once any qualifications are met, a player may request to be granted expert status. Upon becoming an expert, the player may be provided access to chat rooms, message boards, or other areas of the game that are available to experts.

According to some embodiments, experts may designate one or more areas of expertise—that is one or more game-related areas in which they are willing to coach or provide other help. For example, a particular player may limit his expert advice to only a certain type of puzzle, a certain level of the game, a specific game parameter, etc.

Furthermore, according to some embodiments, experts may designate a specific price or price range for their advice. Alternatively, the cost could be determined by the gaming system. As stated above, the "price" need not necessarily be paid in in-game currency. For example, rather than simply stating that a character seeking advice must pay 10 gold pieces for advice, an expert may designate that he will only give advice to a character who can give him a certain item in return for the advice.

According to some embodiments, the cost of advice could be charged to the novice character upon receiving the advice.

For example, experts could post specific pieces of advice on a message board. If a novice reads the posted advice (i.e. opens the message) the novice could automatically be charged the cost associated with the advice. As another example, a novice may enter a chat session with one or more experts. Upon spending a certain predetermined amount of time in the chat session, the novice could be charged a specific cost/fee. Alternatively, the novice could be charged a fee per unit of time of the chat room.

According to one or more embodiments, an arbitration panel could be implemented to oversee and resolve any disputes or conflicts that might arise during the game. For example, a novice who is dissatisfied with the help that he received from an expert could submit a complaint to an arbitration panel. Similarly, an expert who is dissatisfied with the actions of a novice could submit a complaint to the arbitration panel. The panel may be comprised of other experts, other novices and experts, non-players, etc. The panel members may be volunteers, or may be recruited on a voluntary or mandatory basis.

Upon receiving a complaint, the panel may decide whether they vote in favor of the expert who gave the help or the novice who received the help. Whoever the panel decides against may be given some type of penalty. For example, if the panel decides that a particular character's claims have no merit, the novice may be flagged as a "whiner." This label may then be attached to the character for other potential helpers to see. Alternatively or additionally, the character (or player controlling the character) may be barred from submitting complaints to the arbitration panel for a given period of time. Moreover, future panels may be given access to previous arbitration decisions involving the complainant. Alternative or additional penalties may include, without limitation, the character (or player controlling the character) being barred from providing/receiving help for a certain period of time, lowering of the expert's or novice's ranking, full or partial payment refund or reduction, etc.

According to some embodiments, for example those in which a novice is assigned an expert for a certain period of time, payment may be provided on an on-going (e.g. pay as you go) basis. In such a case, should the novice feel that the expert's advice is no longer helpful, the novice may simply stop paying.

According to some embodiments, some or all areas of expertise may requires some threshold competency before a character can be designated as an expert in that area. For example, a character may only be allowed to coach on a particular ability of they character has had that ability for X hours, days, weeks etc, used the ability X times, or achieved a certain number of results (e.g. X number of kills) with the ability. Alternatively or additionally, the threshold competency may be determined by asking the potential expert to take a test or perform some other action. Non-limiting examples of suitable areas of expertise include, reaching a level, using an ability, kill/death ratios, obtaining an object, solving a puzzle, accuracy with weapons, effective use of a weapon, killing a certain character/creature, starting out in the game, successfully navigating through a certain geographic area (e.g. the expert provides or in some way is a map), getting through a certain area using certain skills, game play techniques, or abilities, and/or speed of accomplishing any of the above.

Advice may be provided using any suitable means. For example, the game system may include an in-game communication system such as a chatroom, web interface, text messages, email system, voice communication system, etc. Alternatively or additionally, out of game communication system such as regular email, text messages, phone, and/or mail may be used.

According to another embodiment, experts may be able to observe the game play of novices and notify a novice if he has a suggestion.

Alternatively or additionally, an off-line "replay" system could place the expert in the scenario with which the novice is seeking advice and the novice could watch the expert play that segment. Whether on-line or off-line, one character (e.g. the novice) could shadow the other character (e.g. the expert) during certain parts of the game. The character who is shadowing could be shown on the screen as a "ghost" character. Moreover, the system could allow an expert player to temporarily take over the control of a given novice character. In such a case, the expert's character may be shown as a ghost following the novice character. Alternatively, the novice player may retain control of the novice character while the expert provides advice (for example over an in-game voice system) to the novice. Again, the expert's character could be shown as a ghost following the novice character. As a further alternative, the expert could play the segment while the novice watches. In this case, the novice character could be shown as a ghost following the expert character.

In a further embodiment, novices could submit a segment of game play to an expert pool. Interested experts could each play the segment, essentially competing against each other. The expert with the best performance in the game segment could then be paired with the novice. Alternatively, the novice could be provided with a list of all the experts that completed the segment, along with a price list to see each expert's solution. The novice could then select which expert's advice he would like to receive.

In another embodiment, experts could provide advice on a novice's saved game results. For example, game results could be posted on a message board, and experts could peruse the message board to find a novice they think they could help and/or who they think might pay them for their advice. Alternatively, a contract could be worked out between the expert and the novice and the results viewed by the expert only upon acceptance of the contract.

As stated above, according to some embodiments, novices may be allowed to rate the advice given to them by an expert. Ratings may be provided using any suitable means including, for example, picking a rating from a list (e.g. thumbs up, thumbs down, 1 through 5 stars, a numerical ranking between 1 and 10, etc.) for one or more characteristics and/or an overall ranking or entering a free-form text or voice message. According to some embodiments, the novice may be prompted to give a rating at the end of an advice session and may be required to do so before game play can resume. Alternatively, the novice may be able to defer the rating and go back to it when convenient. As a further alternative, deferred ratings may carry less weight, the longer a novice takes to provide them.

Alternatively or additionally, the game system may automatically rate the advice given by an expert. A system-based rating may be based on whether the player character who received the advice met certain objectives/goals that were the subject of the advice. These objectives/goals may be set by the novice, the expert, or the system. Accordingly, the system may include a mechanism for determining whether the novice who received the advice actually followed the advice given by the expert. If the goals were set by the novice or expert, the system may include a mechanism for identifying the goals in order to determine whether or not they were met by the novice.

For example, if an expert gives a novice advice regarding how to finish a level, the expert's rating may depend upon the how long it took the novice to finish the level, the points and/or skills accumulated by the novice during the level, and/or future success in completing other similar levels. For example, the system may be configured to compare the average skill progress per time of a novice who has received help with the average skill progress per time of other novices.

According to one method of implementing this embodiment, when a character completes a given task (e.g. killing certain monster, finding a certain object), the system checks to see if an expert had given that character advice about that particular quest. If an expert had given advice to that character about that particular quest, the expert could be given a benefit. Accordingly, the system would be configured to record each instance of advice given from the expert to the player and nature of the advice given (i.e how to kill monster X, how to find object Y). The system would be further configured to determine that the novice's actions met the nature of the advice (monster X was killed, object Y was found.) If the advice was limited to a certain identified quest, for example, the system would have to determine whether the character's actions took place during the quest. For example, if monster X or object Y is only available during the identified quest, the system would know that the character was engaging in the identified quest at the time the action was performed.

Moreover, the system could be configured such that if a novice seeks advice from a second expert for advice on the same problem or task, some or all of the benefit that would have gone to the first expert is withheld. This withheld benefit may or may not be passed on to the second expert or refunded in full or in part to the novice.

According to an embodiment, expert ratings can be quantified and compared so that novices can shop for experts. This also provides incentive for experts to give good advice, in order to increase their expert rating and help them increase revenue (in whatever form) from their advice. For example, for each expert, the system may list in a table the average skill progress per time of the novices that the expert coached. The table may then show the expert who coached the characters with the fastest post-coaching progress. Alternatively, for each expert, the system may list in a table the ratio of what each novice gained in the month after coaching versus what the novices paid for the advice. The higher the ratio, the better the "payoff" of the expert's advice. As a further alternative, for each expert, the system may compare the expert's novices' success rates before and after coaching. This would give a measure of how effective the expert's advice was for each novice.

It will be appreciated that all of the methods described above regarding providing ratings of experts may be similarly applied to the rating of novices.

According to another embodiment, awards from successful advice may trickle up an "advice ladder." For example, Character A may give advice to Character B. As Character B's successfully plays through the game, Character A may receive some benefit based on Character B's success. Eventually, Character B may become an expert and give advice to Character C. The game system may be configured such that Character C's success is beneficial not only to Character B, but also to Character A.

Figure 3:
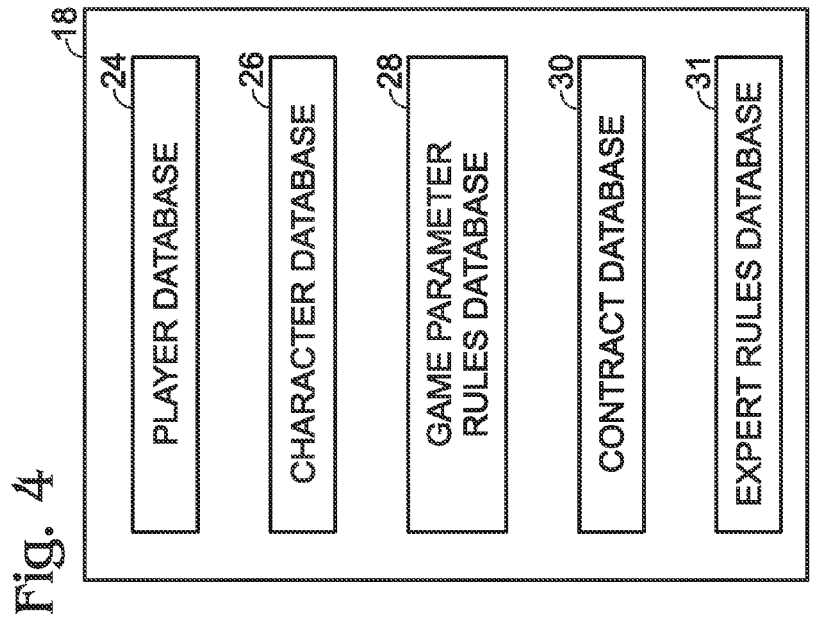
FIG. 3 illustrates a system including an Expert Management program.
Figure 4:
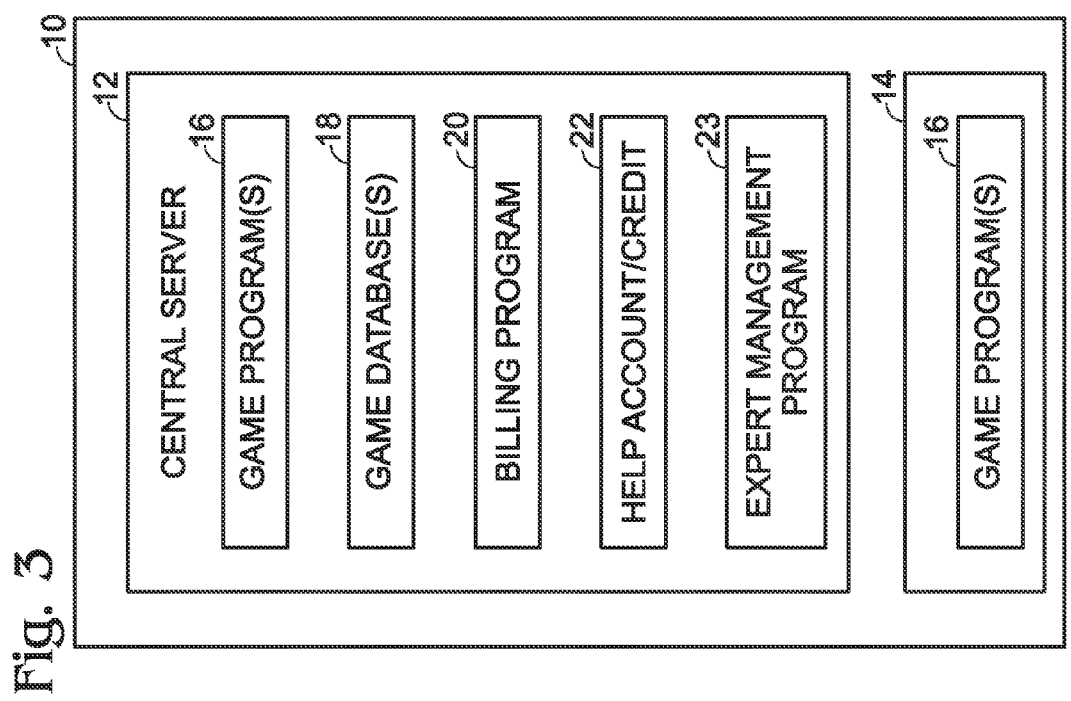
FIG. 4 illustrates additional exemplary databases suitable for use in a system that includes an Expert Management program.

Turning now to FIGS. 3 and 4, FIG. 3 provides a block diagram showing system 10 including an expert management program 23. FIG. 4 provides a block diagram showing suitable exemplary databases that might be included in system 10 when system 10 includes an expert management program. As shown, an additional database, expert rules database 31 is included.

In the embodiment depicted in FIG. 4, in addition to the information described above with respect to FIG. 2, player database 24 may further include information regarding the player's expert settings. If expert status is awarded to the player, the status for the player could be identified. Alternatively, if expert status is awarded to the character, the status for each character in the player's account could be identified.

In the embodiment depicted in FIG. 4, in addition to the information described above with respect to FIG. 2, character database 26 could include information related to expert parameters associated with the character.

In the embodiment depicted in FIG. 4, in addition to the information described above with respect to FIG. 2, contract database 30 could include information related to the identification of the expert who is the party to an expert-novice contract.

The expert rules database 31 could include and associate information related to game parameter identification, game parameter name, game parameter descriptor, expert benefit associated with advice given to fulfill the game parameter, and cost to a novice for receiving a advice for that game parameter.

According to one embodiment, system 10 could be configured to allow players to pay extra to have abilities associated with expert status. For example, system 10 may be configured to receive player account set up information and output an offer to identify a player character as a potential expert. If the offer is accepted, system 10 may be configured to receive a billing rule for the potential expert status and apply the billing rule to the expert and novice player accounts.

According to another embodiment, system 10 could be configured to assign a player or player character to be an expert for a particular game parameter. For example, system 10 may be configured to receive an indication that a player character has completed a game parameter; determine if expert status if available for that parameter, output an offer to be an expert to the player character who has completed that game parameter, and, if the offer is accepted, flag the player character as an expert for that game parameter.

According to still another embodiment, system 10 could be configured to pay an expert character for advice given to a novice character. For example, system 10 may be configured to determine if an expert advice contract has been fulfilled. If an expert advice contract has been fulfilled, system 10 may be configured to retrieve payment criteria for the expert advice that was given and apply the payment criteria to the expert and novice player accounts.

According to another embodiment, the present invention provides a video game environment in which other character players effect attributes of a player character.

According to yet another embodiment, in a massive multi player online video game, characters can vote on attributes of each other. Characters can play with each other within a designated game parameter and can be offered the chance to vote on an attribute of a character they have been playing with once that game parameter is complete. If only two characters are playing with each other, then their respective votes can immediately provide attributes to the other player. If more than two players are playing with one another, then the group vote can determine the attributes that each character can get. Attributes can be positive or negative based on the vote of the other characters. Attributes can be tied to particular player characters or to all the characters in a player account. 1. As non-limiting examples, game parameters may include: 2.

Completing a mission together 3. Playing for a certain period of time 4. Winning a match 5. Reaching a certain level or score 6. using an ability 7. kill/death ratios 8. obtaining an object 9. solving a puzzle 10. accuracy with weapons 11. effective use of the proper weapon 12. killing a certain character/creature 13. getting through or to a certain geographic area 14. speed of accomplishing any of the above 15. As non-limiting examples, attributes may include: 16. A character score 17. A virtual object 18. The physical appearance of a character 19. An emblem or mark 20. A synthetic voice 21. Virtual money 22. Virtual help points or credits 23. The ability to join groups of other players at a later time 24. Real Money 25. Discounts off monthly fees for playing the game In an alternate embodiment, characters completing a game parameter together can choose an attribute to give to the other characters from a list of available attributes provided by the system.

A visual icon of a multi player score of a player could be visible on the character. For example, a good character gets a trophy or medallion, and a bad character gets an onion. The player's score could actually change the appearance of the character in a game like Everquest. If teammates hate to play with you, your character has a lemon emblem placed on his shield. He could also look like a leper.

The synthetic voice of a character could also be determined based on what other players think of him. For example, an unliked teammate with a bad score could be forced to speak in an annoying voice, such as a Napoleon Dynamite voice and a liked teammate could be given a pleasant or impressive sounding voice, such as the voice of James Earl Jones.

According to one embodiment, if a player has a bad teammate score, then all the new characters they create in a game could be affected by that score.

According to one embodiment, bad teammate scores could be determined the way that is similar to the way in which a hero in the game City of Heroes becomes a villain. I.e. kill enough of your teammates and you turn into a villain.

According to one embodiment, a player with a bad team score could have to pay a penalty tax of experience or virtual money, similar to dying in guild wars. As long as others do not like him, he acquires experience and virtual money at a slower rate.

According to one embodiment, when a player ranks another player, the system could treat all player's rankings equally, or, the system could weight rankings from better players higher than lesser players. A system based upon weighted averages could be used to combine multiple player rankings for any given team member or team.

According to one embodiment, a method to prevent one player from taking revenge upon another player(s) could be utilized. For example, to prevent a player from ranking another player that had recently "killed" him, and/or any ranking of another player that is "out of character" based upon all other rankings, rankings that occur after such an incident might carry a lower weight until or unless validate through other similar unfavorable (or favorable) rankings.

According to one embodiment, the game may provide a method for appealing an unfavorable ranking: In such an embodiment, any player could appeal to have any given ranking removed by either: asking other players to cast a vote to cancel the ranking (such other players must be of equal or greater ranking as the original evaluator. A vote to remove a ranking could require a three to one, or greater, ratio.

According to one embodiment, if players are not liked by other players, they cannot advance in the game.

According to one embodiment, attribute selection can be a range of attributes from very positive to very negative. For instance a group of characters can decide to give each other attributes from a list of five attributes. The first attribute is the best, like a weapon or experience, and the last attribute is the worst, like a bad synthetic voice or a lemon icon on your shield. Each character votes on what attribute to give other characters. An item is selected and applied to a character account by the system based on the votes of other characters in the first character's party.

According to one or more embodiments, in a virtual environment a first player character can establish a contract with either one or more other player characters, entities (real or virtual) or a game server. The contract may specify one or more virtual financial obligation values that the first player character is obligated to pay at a specified virtual or real time and date. The contract may additionally include a credit card number associated with the game account of the first player. According to additional embodiments, in the event that the first player character fails to pay the virtual financial obligation value specified by the contract, a real cash value may be established that equals the virtual financial obligation value and the first player's credit card may be charged the real cash value amount.

Examples of in game contracts include, but are not limited to:

1. Virtual loans—a player character or entity can borrow virtual cash from another player character, entity or the game server. An interest rate and payment schedule can be established, and payments can be secured by the player character's or entity's credit card.

2. Virtual item rental—a player character or entity can rent an in game item from another player character, entity or the game server. A virtual cash fee per unit time can be established and secured with the player character's or entity's credit card.

3. Virtual dividend payments for shares of a company—a player character or entity can take his virtual company public by selling shares to other player characters or entities. He can guaranty a virtual cash dividend for each share per unit time. He can secure the virtual cash dividend with his credit card.

4. Virtual finance options—a player character or entity can choose to pay for an in game item with virtual cash over time rather than up front. A virtual cash payment amount and payment schedule is established, and the player or entity secures the virtual cash payments with a credit card. If the player character or entity cannot make a specified virtual cash payment amount on a scheduled payment date, a real cash value is determined for the payment amount and charged to his credit card.

5. Virtual item creation—A first player character can agree to build an in game item for a second player character by a certain date. If the first player character does not build the item in the time specified, either the virtual bank account or a credit card on file can be charged a specified fee for each unit of time that it is late. Also, if the first player character took an advance and or raw materials from the second player character, a virtual cash fee can be charged to the first player's credit card equal to the virtual cash value of the advance. If the first player character can make the virtual cash payment, a real cash value can be determined that is equal to the virtual cash value and charged to the first player's credit card.

6. Virtual futures contracts on goods bought or sold on an exchange—a player character can establish an agreement to buy or sell, with virtual cash, a particular amount of a game resource or item at a specified virtual or real time period. A real cash value is determined that is equal to the virtual cash value of the buy or sell offer. If the player character is unable to sell or purchase the item at the specified time, either (i) a penalty, (ii) all or a portion of the real cash value of the contract or (ii) any combination of one and two above can be charged to the player's credit card.

7. Virtual help with solving a mission or other game parameter—a first player character can agree to help a second player character to solve a mission or other game parameter within a given time period. If the first player character fails to help the second player character complete the specified game parameter in the time specified, a penalty fee can be charged to his credit card. Alternatively, a first player character can agree to pay a second player character a specified virtual cash amount if the second player character agrees to help him to complete a mission or other game parameter. If the second player character helps the first player character to complete the game parameter, and the first player character does not pay the agreed to virtual obligation, the first player's credit card can be charged a penalty and or the real cash value of the virtual obligation.

8. Virtual Insurance Payments and Claims—a player character can insure an in-game item with another player character or a game server. A periodic virtual cash insurance premium payment can be determined for the item. If the player character cannot make a periodic virtual cash insurance premium payment, then his credit card is charged the real cash value of the periodic payment and/or a real cash fee. Alternatively, a first player character makes a claim on a virtual insurance policy. The game server verifies that the virtual insurance claim is legitimate, determines a virtual claim value, and charges a second player character (who issued the claim) the virtual claim value amount. If the second player character cannot pay the virtual claim value, then a cash value is determined and charged to the second player's credit card on file.

9. Virtual Shipping—a first player character can agree to ship an item for a second player character to a certain virtual location in the game before a certain virtual or real date. The shipment of the item is secured with a credit card associated with the first player character. If the item is not shipped or arrives late or damaged, a virtual cash fee can be charged to the player character account. If the first player character account does not have enough virtual cash to cover the fee, a real cash value for the fee can be determined and charged to the credit card associated with the first player character.

10. Virtual Deposits and Interest Payments—a first player character deposits virtual money into an account with a virtual bank owned by one or more other player characters. The deposit balance and any periodic virtual interest due on the balance are secured by at least one credit card associated with the player characters that own the virtual bank. If the bank is unable to pay a requested withdrawal amount equal or less than the virtual bank account balance, the credit card securing the deposit can be charged the real cash value of the requested withdrawal amount. Also, if the bank cannot make a periodic interest payment, the credit card securing the interest payment can be charged the real cash value of the payment.

11. Identification Verification—a player character may use a credit card as a means to identify himself as the owner of a player character and/or to establish liability for a player character's actions, including whether or not a player character pays bills on time, in full, etc.

12. Loyalty Program Identification—a player character may use a credit card number as a unique identifier for use as an ID for loyalty programs or frequent shopper programs and the like.

13. Layaway financing—a player character may purchase an in game object, service or resource, placing it into a "layaway" account and have monthly or other periodic charges added to his credit card until such time as the entire balance is paid off, at which time, the Player Character would receive the object, service or resource.

14. Virtual Taxes—A player character can agree to pay a certain amount of taxes, tariffs, tolls to a government structure run by the game server or by player characters. In the event that a player character cannot make a tax payment a real cash value for the virtual cash amount can be determined and charged to a credit card associated with the player character.

15. Virtual Adjudication—In the event of a dispute (e.g., between player characters, between a player character and a game server) a trial (e.g., by a game server, by one or more player characters, by a group consisting of one or more players, by other entities) can be initiated, conducted and used (in whole or in part) to make a determination, such as to determine a virtual settlement or other amount that a first player character needs to pay (e.g., to a second player character). In an embodiment, one or more of the entities involved in the dispute can select the entity or entities used to adjudicate the dispute. The first player character can be given a time period within which to pay the amount so determined or to take another action as determined by the adjudication. In an embodiment, if the first player character cannot pay by the time specified, a real cash value can be generated and charged to his credit card.

16. Hacking the System or Breaking Rules—Player Characters can agree to pay penalties if they hack the system or break the rules. If it is determined that a player character has broken the rules or hacked the system, the credit card associated with the player character account can be charged a specified penalty amount.

According to one or more embodiments of the present invention, any financial account can be used by the player to secure the virtual contracts he establishes with his player characters. The following accounts are non-limiting examples of the type of player character-owned accounts that can be used, individually or in any combination, to secure a virtual contract: 1. credit card 2. debit card linked to a bank account 3. a bank account 4. a checking account 5. an IRA account 6. paypal account 7. Play time card—a player can buy a play time card that allows them to play for a specific period of time. A portion of the credit on the card can be locked up to secure virtual obligations in the game environment 8. personal guaranty—a player can sign a personal guaranty that allows the game server to put a lien on the player's real world assets in the event of a default on a contract in a game environment. 9. Escrow account—a player character can place virtual or real items in escrow that he can use as collateral against in game contracts. 10. Margin account—a game server or first player character can establish a margin account for a second player character that the second player character can use to secure in game contracts. A margin account could be automatically given to a player character by a game server once certain game attributes, skills, and levels have been reached. 11 Annuity account—a player character can allocate a portion or all of his payments due to him under an annuity, such as a life insurance payout, lottery winnings, judgment award, reverse mortgage, or any other annuity based income.

The amount charged to the player's credit card in the event of a default on a virtual contract can be: 1. The real cash value of the virtual obligation that was not paid 2. A specified penalty amount 3. A penalty amount generated based on the default amount 4. A real cash amount either equal to, less than or greater than the virtual amount. 5. Any combination of the above.

According to one or more embodiments of the present invention, the game server can automatically charge virtual cash values to the player character bank account or the game server can notify a player character when a virtual cash value is due.

According to one or more embodiments, Player Characters who have reached certain levels of the game or acquired certain amount of virtual value in a game may not be required to secure their contracts with a credit card. Such "financially secure" Player Characters may vouch for less financially secure player characters by offering their virtual value as collateral. Alternatively or additionally, Player Characters may also receive margin dollars based on the level or skills they have obtained.

According to one or more embodiments of the present invention, Player characters can be given a warning and a grace period if they do not pay the virtual cash obligation on the virtual or real date specified or there is not sufficient virtual cash in their virtual cash account for the virtual obligation to be automatically withdrawn.

According to one or more embodiments of the present invention, warnings may be delivered by any one or more of the following mechanisms including, but not limited to, in game alerts, in game instant messaging, real world e-mail, voice mail, postal mail, or text messages.

According to one or more embodiments of the present invention, Player characters could have the choice of using virtual or real cash to pay the virtual obligation when it becomes due. Characters could be offered this option on every purchase they make in a game environment. For example, a player purchasing a game item in an in game exchange can elect to pay real or virtual money during the transaction. The exchange interface offers the choice between purchasing the item for real or virtual cash and the value of the item in real and virtual cash is displayed. If the player selects virtual cash, the amount is debited from his virtual cash account. If the player selects real cash, the amount is charged to his credit card on file.

According to one or more embodiments of the present invention, when making a decision to use real or virtual cash to pay for an item or service, the player character (and/or game server) may request bids from other player characters or entities to pay for the item at some level of exchange rate that differs from the current exchange rate. For example, if a player character wishes to buy a virtual sword and the price is: $10 USD or 100 units of in game currency (e.g. piece of gold, $LD, etc.), there may be third party player characters that may desire to pay the real cash value in exchange for some amount of LD, that may be less or more than the current exchange rate.

According to one or more embodiments of the present invention, when a player's financial account cannot cover the real cash obligation specified by a virtual contract, the account can be suspended and the virtual assets owned by the player character can be automatically liquidated and the proceeds divided amongst virtual contract holders (other player characters or the game server) in ratio of the contract values. Alternatively or additionally, some or all of the virtual assets owned by the player may be immediately sold for their market value. The assets may be sold one at a time (in any order specified by the rules of the game server i.e. most to least valuable, least to most valuable, most to least liquid, least to most liquid, etc) until the virtual obligations of the player character have been met. If all the assets of the player character are sold and the virtual cash does cannot cover the virtual obligations, the cash can be paid to the creditors using any suitable means including, but not limited to: (i) in ratio equal to the obligation for each creditor compared to the total outstanding obligations; and/or (ii) in order of priority. A creditor can be given priority based on (i) paying to be a priority creditor when the virtual contract is established; (ii) the amount of the obligation; (iii) the date the virtual contract was established; (iv) the remaining obligation of the contract vs. the total obligation; or (v) paying off debts to independent third party player characters or entities as opposed to those player characters/entities that are either own by or related to the indebted player character.

According to one or more embodiments of the present invention, the game server can periodically ping the credit card or other financial account identifier of the player to make sure that there is adequate cash or credit line associated with the account to cover all the virtual obligations that the player has established with his characters.

According to one or more embodiments of the present invention, when a virtual obligation is established, an amount that is equal to or a percentage of that obligation can be locked on the credit card so that it cannot be used for anything other than covering the virtual obligation.

According to one or more embodiments of the present invention, when a virtual obligation is established, an interest in an insurance policy can be purchased for a fee that is charged to the credit card. According to one example of this embodiment, in the event of a default, the insurance policy pays the debt; however the player character's rating would be lowered and/or future policies rejected outright. If an insurance company (real or virtual) pays the debt, the insurance company could seek restitution from the defaulting player character.

According to one or more embodiments of the present invention, the game server can conduct a preauthorization of the player credit card equal to the cash value of the virtual obligation when the virtual contract is established. If the preauthorization fails, the contract cannot be executed and the appropriate parties (player characters and or game server) are notified.

According to one or more embodiments of the present invention, a player character may not be able to sell assets in a game or on an exchange between game servers or games if he has contracts established in a game environment. Alternatively, an amount of the player character's assets equal to his virtual cash obligations cannot be sold on an in game, inter game server, or intra game exchange.

According to one or more embodiments of the present invention, when a player character creates a contract, the game server can upsell a credit card to that player character to use to secure the contract. If the player character accepts the offer, he fills out a credit card application. The application is submitted to the card issuing bank. If the bank accepts the application, a new card number is issued and used to secure the contract.

According to one or more embodiments of the present invention, when a player creates a game account, the game server can upsell a credit card that the player character can use to secure contracts (and pay for his monthly fees) As an incentive to sign up for the card, the card can be issued with a certain amount of credit line that can be used to secure contracts with no payment obligation for the player. For example, the player could be given $50 worth of credit line to use to secure against in game contracts. If the player defaults on a contract in the game, the game can automatically charge the credit card account the specified penalty amount. As long as that amount is less than $50, then the player is not obligated to pay off the balance on the credit card.

According to one or more embodiments of the present invention, a fee can be charged by a game server or player character who facilitates and enforces the contracts between other player characters and the game server. This fee can be a flat fee, a "per transaction" fee, or a percent of the total value of the contract or payment fee.

According to one or more embodiments of the present invention, rather than a real cash fee being charged to a credit card only when the virtual obligation cannot be paid with virtual cash, the player can just pay a recurring real cash fee to borrow virtual cash in a game environment. Either the game server or the player character can issue the virtual loan and receive the monthly real cash fee. The monthly fee can be charged to the player character by the game server and a portion of the fee can be remitted, in real or virtual cash to a second player character who initiated the loan.

According to one or more embodiments of the present invention, a player character can rent a sum of virtual cash for a monthly real cash fee that is charged to his credit card. In this embodiment, a player pays a monthly real cash amount as long as he has borrowed a certain amount of money from a game server or other player character. According to one example of this embodiment, when the player character repays the loan, the real cash monthly fee may no longer collected by the game server.

According to one or more embodiments of the present invention, a player character can also rent a sum of virtual cash for a recurring virtual cash fee. If the player character cannot pay the recurring virtual cash fee, a real cash value is determined and charged to the player credit card.

According to one or more embodiments of the present invention, a player character can be offered the choice to pay a basic monthly fee for his account, or an additional monthly fee for his account that includes an upfront loan of virtual cash.

In an embodiment, the contract database may include information about any virtual agreements entered into by player characters. Examples of information the contract database may maintain include, but are not limited to: contract ID, player character ID, Player character type, contract type, contract obligation(s). For many of these information categories, a given contract may have multiple entries. For example, a given contract entered into by a given player character may have numerous contract obligations which can be tracked and maintained by the contract database. Examples of contract obligation information that could be tracked and maintained by the contract database includes, but is not limited to: player character, obligation type, obligation amount, obligation date, obligation penalty, obligation grace period, obligation warning message, and default rules.

A virtual bank database may include information related to the methods and financial instruments used to guarantee certain in-game agreements. For example, the virtual bank database may include information including, but not limited to: player character owner, player character owner credit card number, account balance, maximum deposit limit, interest rate, interest payment schedule, player character account, and loan account number. Any of these categories of information may include subcategorizable information. For example, the player character account information may include numerous sub-categories of information including character ID, character balance, character interest rate, and interest payment schedule. Alternatively or additionally, the loan account information may include sub-categories of information including character ID, loan amount, payment(s), interest rate, and credit card number.

The following paragraphs describe various methods and steps therein according to the present disclosure:

Establishing a Contract a. Loan i. Player Character to Game Server 1 Receive virtual contract initiation request including virtual cash loan amount from player character 2. Determine contract obligations and conditions of loan 3 Output obligation and conditions of loan 4. Receive acceptance of obligations and conditions 5 Retrieve or receive player credit card number associated with player character 6. Activate and store virtual loan contract along with loan amount, obligations, conditions, limits (if any) and player credit card 7. Issue virtual cash loan amount to player character ii. Player Character or entity to Player Character or Entity 1 Receive, store, and output and post virtual cash loan request from a first player character 2. Receive, store, and output response to virtual cash loan request including obligations and conditions from a second player character 3. Receive acceptance of obligations and conditions from first player character 4. Retrieve or receive credit card associated with first player character 5. Create, activate and store a virtual contract including obligations, conditions, and credit card 6. Receive virtual cash loan amount from second player character 7. Issue virtual cash loan amount to first player character b. Dividend i. Player Character (or Entity) to Player Character (or Entity) 1. Receive a request to sell shares of a virtual company including a guaranteed virtual cash dividend per time period per share amount from a first player character 2. Retrieve or receive a credit card associated with first player character 3. Store request to sell shares including credit card and dividend information. 4. Output request to sell shares 5. Receive a request to buy shares from a second player character 6. Receive virtual cash payment for shares from a second player character 7. Distribute virtual cash payment for shares to first player character 8. Receive shares for virtual cash payment 9. Distribute shares to second player character c. Finance Option i. Player Character to Game Server 1. Receive request to purchase an in game item with virtual cash from a player character 2. Generate and output one or more virtual offers to finance the item purchase that includes a number of virtual cash payments at a specified number of time period intervals 3. Receive an acceptance of a finance offer from the player character 4. Retrieve or Receive a credit card associated with the player character 5. Establish and store financing contract including the virtual cash payment amount, the number of payments, the dates for each payment, and the credit card information. 6. Output virtual item to player character. ii. Player Character to Player Character 1. Receive and post a request from a first player character to sell a virtual item, including a virtual purchase price and one or more finance option packages that include a finance payment price, a total number of finance payments, and a schedule of when the payments are due. 2. Receive virtual item from virtual account of first player character 3. Receive a request to purchase the virtual item from a second player character including an agreement to purchase the item with a finance option package. 4. Retrieve or Receive the credit card number associated with the second player character 5. Store request to purchase the virtual item with the credit card 6. Output virtual item to second player character account d. Item Creation i. Player Character to Player Character 1. Receive, Store and Output a request to assemble an in-game item, including at least one of (i) a virtual cash amount, (ii) a blueprint, (iii) in game natural resources and game items necessary to assemble the item, (iv) a date/time of expected delivery, and (v) the agreed upon or expected quality of the item or its constituent components. 2. Receive an acceptance of the offer by a second player character who has the appropriate skills necessary to assemble the item, including the price and a time when the item will be complete. 3. Receive or retrieve a credit card associated with the second player character. 4. Store credit card with accepted offer to assemble an in-game item.

e. Futures Contracts i. Player Character to Game Server 1. Receive a virtual offer to buy or sell an in game item or in game resource at a specified later date and price, including an offer amount from a player character 2. Accept offer 3. Retrieve or receive credit card associated with player character 4. Store credit card with offer 5. Receive offer amount from player character ii. Player Character to Player Character 1. Receive a virtual offer to buy or sell an in game item or in game resource at a specified later date and price, including an offer amount from a first player character 2. Receive an acceptance of the virtual offer from a second player character 3. Receive or retrieve a credit card associated with the first player 4. Create, activate, and store a virtual offer contract including the credit card number of the first player character 5. Receive virtual offer amount from second player character account 6. Transmit virtual offer amount to first player character account (less transaction fee if applicable)

f. Help with Solving a Mission i. Player Character to Player Character 1. Receive, store and output a virtual request for help in solving a virtual mission from a first player character including a mission, a date by which the mission must be complete, an amount to pay if the mission is completed and a penalty for not completing the mission 2. Receive an acceptance of the virtual request from a second player character 3. Receive or retrieve a credit card for both player one and player two 4. Store credit cards with request 5. Make request active 6. Determine if request was fulfilled by specified date 7. If request was fulfilled charge virtual payment amount to first player character virtual account. a. If first player character virtual account cannot fulfill payment amount, determine real cash value for virtual payment amount and charge real cash value to credit card or insurance policy associated with first player character 8. If request was not fulfilled, retrieve virtual penalty amount and charge amount to virtual account of second player character a. If virtual account of second player cannot cover virtual penalty amount, determine real cash value of virtual penalty and charge real cash value to credit card or insurance policy associated with second player character g. Insurance Premium i. Player Character to Player Character 1. Receive, store and output a virtual contract to insure a particular virtual item from a first player character 2. Receive an offer to accept the contract, including at least one virtual insurance premium amount from a second player character 3. Receive an acceptance of the virtual insurance premium amount from the first player character 4. Retrieve or receive a credit card for both the first and second player character 5. Activate virtual insurance contract and store credit card numbers with contract 6. When virtual premium is due, charge premium amount to virtual account of the first player character a. If the virtual premium payment cannot be taken from the virtual account of the first player character, determine a real cash value for the virtual premium and charge the real cash value to the player character's credit card ii. Player Character to Game Server 1. Receive a request to insure a virtual item from a player character 2. Generate and output at least one virtual insurance premium amount including at least one date when the premium amount is due. 3. Receive acceptance of virtual insurance premium amount 4. Create virtual insurance contract 5. Retrieve or receive a credit card associated with player character 6. Store credit card with virtual insurance premium amount.

h. Insurance Claim i. Player Character to Player Character 1. Receive a virtual claim on an virtual insurance contract from a first player character 2. Determine if virtual claim is valid 3. If claim is valid, determine a virtual claim value based on virtual insurance contract 4. Determine a second player character who issued the virtual insurance contract 5. Output request for virtual payment for virtual claim value to a second player character 6. If second player character does not pay the virtual payment, determine a real cash value for the virtual claim value 7. Charge the real cash value to the credit card associated with the second player character.

i. Shipping i. Player Character to Player Character 1. Receive a virtual item to ship from a first player character including a present virtual location and a requested virtual location 2. Determine and output a virtual shipping amount, delivery date, and real cash penalty amount 3. Receive acceptance of shipping amount and delivery date from a second player character 4. Receive or retrieve a credit card associated with second player character 5. Create shipping contract with virtual item, shipping amount delivery date, penalty amount, and credit card 6. Determine if item was delivered on or before delivery date 7. If item was delivered, charge shipping amount to first player character account 8. If item was not delivered, retrieve penalty amount 9. Charge penalty amount to credit card ii. Player Character to Game Server 1. Receive a virtual item to ship from a player character including a present virtual location and a requested virtual location 2. Determine and output a virtual shipping offer, including a virtual shipping amount, delivery date, and real cash penalty amount 3. Receive acceptance of the virtual shipping offer 4. Receive or retrieve credit card associated with player character 5. Deliver item 6. Charge shipping amount to player character a. If player character cannot pay shipping amount, retrieve real cash penalty amount and charge amount to player credit card.

j. Virtual Bank Deposit i. Player Character to Game Server (set up virtual bank) 1. Receive a request to set up a virtual bank from a player character including one or more credit cards with corresponding credit lines 2. Set up virtual bank with an allowed deposit limit equal to the corresponding credit lines 3. Receive an interest rate amount 4. Store interest rate amount with virtual bank ii. Player Character to Player Character (receive deposit) 1. Output a bank deposit offer from a first player character, including a maximum deposit amount and an interest rate 2. Receive a request to make a virtual cash deposit from a second player character that is equal or less than the maximum deposit amount 3 Determine if second player character already has an account with the virtual bank a. If not, set up virtual bank account for second player character and deposit virtual cash funds Or b. If so, deposit virtual cash funds into existing virtual bank account associated with second player character 4. Reduce maximum allowed deposit amount by virtual cash deposit k. Taxes i. Player character to game server or player character 1. Receive request from a player character to become a member of a virtual entity or use a virtual service 2. Generate and output a tax amount 3 Receive an acceptance of the tax amount from the player character 4. Retrieve or receive a credit card associated with the player character 5 Create a membership or permit including player character information and credit card number l. Adjudication i. Player character to player character 1. Receive and Store a determination of a virtual settlement amount to be paid by a first player character to a second player character including a virtual cash amount and a due date 2. Receive or retrieve a credit card associated with the first player character 3. Store credit card with determination m. Breaking rules or hacking the game i. Player character to game server (initial agreement) 1. Receive request to create an account from a player 2. Output terms and conditions including agreement to charge penalty fees to a credit card in the event of rule breaking or hacking 3. Receive and store acceptance of terms, player information, and player credit card information Enforcing a Contract a. Loan, Dividend, Finance Payment, Insurance Premium ii. Player Character to Game Server 1. Determine that a virtual obligation payment is due 2. Charge obligation payment to player character account 3. If player character account cannot cover obligation payment, determine a real cash value of obligation (including fees and/or penalties and fines) 4. Charge real cash value to player credit card iii. Player Character to Player Character 1. Receive a complaint that a first player character could not pay a second player character a virtual obligation payment 2. Determine if complaint is valid 3. If complaint is valid determine or retrieve a real cash value of obligation payment 4. Charge real cash value to credit card associated with first player character 5. Pay second player character the virtual obligation payment (in real or virtual cash)

b. Item Creation iv. Player Character to Player Character 1. Receive a complaint that a first player character did not complete the creation of an item for a second player character. 2. Verify that complaint is valid 3. If complaint is valid, retrieve a real cash penalty value associated with the item creation contract 4. Retrieve a credit card associated with a first player character 5. Charge real cash penalty value to credit card 6. Credit real or virtual account of second player character with penalty value (less applicable fees)

c. Futures Contracts v. Player Character to Game Server 1. Receive indication that player character could not fulfill futures contract 2. Retrieve or Generate a penalty amount 3. Charge penalty amount to virtual account of player character 4. If virtual account cannot cover penalty, retrieve player credit card 5. Determine a real cash value of the penalty amount 6. Charge amount to player credit card vi. Player Character to Player Character 1. Receive complaint from a first player character that a second player character could not fulfill a futures contract 2. Verify that complaint is accurate 3. Retrieve or generate a virtual penalty amount 4. Retrieve credit card of second player character 5. Charge second player character the virtual penalty amount 6. If second player character account cannot cover virtual penalty amount, generate a real cash value 7. Charge real cash value to credit card 8. Pay penalty amount (in real or virtual cash) to the first player character, less any applicable fees.

d. Help with Solving a Mission vii. Player Character to Player Character 1. Receive a complaint that a first player character has not successfully helped a second player character complete a mission 2. Verify complaint 3. If complaint is accurate, retrieve virtual penalty 4. Charge first player character account penalty amount 5. If first player character account cannot cover penalty amount, determine real cash value of penalty amount 6. Retrieve credit card associated with first player character 7. Charge real cash value of penalty amount to credit card e. Insurance Claim viii. Player Character to Game Server 1. Receive a complaint that a first player character has not paid an insurance claim to a second player character 2. Validate complaint 3. If complaint is validated, determine real cash value of claim 4. Retrieve credit card associated with first player character 5. Charge real cash value of claim to credit card (plus applicable fees) 6. Pay real or virtual cash value of claim to second player character (less applicable fees)

f. Shipping Item ix. Player Character to Player Character 1. Receive complaint that a first player character did not deliver an item for a second player character 2. Validate complaint 3. If complaint is validated, determine a real cash penalty amount 4. Retrieve credit card of first player character 5. Charge penalty amount to credit card (plus applicable fees) 6. Determine a virtual cash value for the real cash penalty amount 7. Pay virtual cash value to account of second player character (less applicable fees) x. Player Character to Game Server 1. Deliver a virtual item to a specified virtual location 2. Charge shipping amount to player character account 3. If player character account cannot pay shipping amount, retrieve credit card associated with player character account 4. Determine a real cash penalty amount 5. Charge penalty amount to player credit card g. Virtual Bank Deposit xi. Player Character to Player Character 1. Receive a request from a first player character to withdraw funds from a virtual bank account owned by a second player character 2. Determine if the virtual bank has enough virtual cash to cover the withdrawal amount a. If yes, transfer funds from virtual bank account to first player character account b. If no, determine a real cash value for the withdrawal amount i. retrieve credit card associated with virtual bank ii. charge credit card real cash value of withdrawal amount (plus any fees) iii. transfer funds from virtual bank account to first player character account h. Virtual Bank Interest xii. Player Character to Player Character 1. Determine that interest is due on a balance deposited by a player character in a virtual bank account. 2. Calculate virtual cash interest payment 3. Determine if virtual bank has enough virtual cash on hand to cover interest payment a. If so, make interest payment b. If not, determine a real cash value of interest payment i. Retrieve credit card associated with virtual bank ii. Charge credit card real cash value iii. Convert real cash value into virtual cash and deposit into virtual bank iv. Transfer virtual cash from virtual bank to player character bank account.

i. Taxes xiii. Player character to game server 1. Receive or Generate indication that a virtual tax is due 2. Determine virtual tax amount 3. Attempt to charge tax amount to virtual cash account of player character 4. If virtual cash account can cover tax amount, remove tax amount from account 5. If virtual cash account cannot cover tax amount: a. Determine a real cash value of the virtual tax amount b. Retrieve credit card associated with player character account c. Charge real cash value to player character account (plus applicable fee) d. Convert real cash value to virtual cash amount and deposit in virtual cash account of player e. Remove virtual cash amount from player character virtual cash account xiv. Player character to player character 1. Receive or Generate indication that a virtual tax is due from a first player character to an entity controlled by one or more other player characters 2. Determine virtual tax amount 3. Attempt to charge tax amount to virtual cash account of player character a. If virtual cash account can cover tax amount, transfer virtual cash amount from first player character virtual cash account to virtual cash account of entity controlled by one or more other player characters 4. If virtual cash account cannot cover tax amount: a. Determine a real cash value of the virtual tax amount b. Retrieve credit card associated with first player character account c. Charge real cash value to first player character account (plus applicable fee) d. Convert real cash value to virtual cash amount and deposit in virtual cash account of first player e. transfer virtual cash amount from first player character virtual cash account to account of entity controlled by one or more other player characters j. Adjudication xv. Player character to player character 1. Retrieve determination on due date 2. Attempt to charge virtual settlement amount to first player character virtual cash account 3. If first player character virtual cash account can cover settlement amount, transmit amount (less applicable fees) to second player character virtual cash account 4. If first player character virtual cash account cannot cover settlement amount: a. Determine a real cash value for the virtual settlement amount b. Charge real cash value to credit card associated with first player character c. Convert real cash to virtual cash d. Transfer virtual cash (less applicable fees) to the virtual cash account of the second player character k. Breaking rules or hacking the game xvi. Player character to game server (infraction occurrence) 1. Determine that a player character has committed an infraction 2. Determine a penalty amount 3. Retrieve credit card associated with player character 4. Charge credit card penalty amount Locking player character accounts and liquidating assets a. Determine that a virtual obligation cannot be paid with a virtual account associated with a player character b. Determine a real cash value for the virtual obligation c. Retrieve credit card associated with player character d. Attempt to charge real cash value of virtual obligation to credit card e. If attempt fails, lock virtual assets of player character account, f. Post and sell virtual assets on game marketplace or exchange g. Retrieve virtual creditor list h. Determine % of player character asset value due to each virtual creditor i. Transmit appropriate % of asset value to each virtual creditor Generating warning message if virtual obligation cannot be met a. Determine that a virtual obligation cannot be paid with a virtual account associated with a player character b. Determine a real cash value for the virtual obligation c. Retrieve credit card associated with player character d. Attempt to charge real cash value of virtual obligation to credit card e. If attempt fails, output warning message to player character Disabling selling virtual assets if Player Character has virtual obligations a. Determine a total virtual obligation amount for a player character b. Set a minimum virtual asset limit for the player account based on the total virtual obligation amount c. Disallow selling of any player character assets below virtual asset minimum.

Periodic check of credit card validity a. Determine that a player character account has a virtual obligation secured by a credit card b. Retrieve credit card number c. Verify that credit card is valid and/or has enough remaining credit to cover virtual obligation. d. If credit card is not valid and/or does not have enough remaining credit to cover a virtual obligation, lock assets of player character account equal to total virtual obligation amount.

Credit card upselling during contract initiation a. Receive request to initiate a virtual contract from a player character b. Output offer to register for a credit card to secure the transaction c. Receive acceptance of offer, including player billing information d. Submit credit card application for approval e. If credit card application is accepted, bind virtual contract with new credit card. f. If credit card application is denied, output request to player character to use a different credit card to bind virtual contract xvii. Receive alternate credit card from player character xviii. Use alternate credit card to bind contract Credit card upselling during player set up a. Receive request to create new player account b. Output offer to register for a credit card, including an upfront virtual benefit if offer is accepted c. Receive acceptance of offer, including player billing information d. Submit credit card application for approval e. If credit card application is accepted, issue credit card, set up player account with credit card, and store virtual benefit with player account f. If credit card application is denied, output request for alternate credit card xix. Receive alternate credit card xx. Set up player account with alternate credit card Providing a choice between virtual cash or credit card charge a. Determine that a virtual obligation of a player character is due b. Determine a virtual and real cash value of the obligation c. Output notification that virtual offer is due, including choice to pay for virtual obligation with real or virtual cash xxi. Receive indication that virtual obligation will be paid with real cash xxii. Charge real cash value to credit card associated with player character account Or xxiii. Receive indication that virtual obligation will be paid with virtual cash xxiv. Charge virtual cash value to player character virtual account Real cash charge to credit card for virtual loan payment or rental a. Determine that a virtual obligation of a player character is due b. Determine real cash value of virtual obligation c. Retrieve credit card associated with player character d. Charge real cash value of virtual obligation to credit card.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

The invention is described with reference to several embodiments. However, the invention is not limited to the embodiments disclosed, and those of ordinary skill in the art will recognize that the invention is readily applicable to many other diverse embodiments and applications. Accordingly, the subject matter of the present disclosure includes all novel and nonobvious combinations and subcombinations of the various systems, methods and configurations, and other features, functions, and/or properties disclosed herein.

The systems methods described herein are provided for the purposes of example only and that none of the above systems methods should be interpreted as necessarily requiring any of the disclosed components or steps nor should they be interpreted as necessarily excluding any additional components or steps.

What is claimed is:

1. A method performed by a computer, the method comprising:
communicating, by the computer, with a plurality of game devices to provide a virtual video game environment, wherein each game device allows at least one respective player to access the computer, wherein each of the players controls at least one player character;

wherein the plurality of player characters interact with one another and wherein the virtual video game environment includes a plurality of game parameters that are completed by the player characters as the player characters progress through the game;

identifying, by the computer, game parameters which can be completed by receiving help from another player character;

permitting, by the computer, a first player character of the plurality of player characters to post a request for help for the other players to view;

permitting, by the computer, a second player character of the plurality of player characters to accept the request for help;

permitting, by the computer, the second player character to provide help to the first player character;

determining, by the computer, whether the first player character successfully completes a first game parameter; and providing, by the computer, a benefit to the second player character based on whether the first player character successfully completes a first game parameter.

2. The method of claim 1 further comprising:
determining if a player character received help from another player character on a game parameter; and
allowing the player character to complete the game parameter if the player character received help from another player character.

3. The method of claim 2 further comprising
preventing the player character from completing the game parameter if the player character has not received help from another player character.

4. The method of claim 1 further comprising:
determining if a player character received help from another player character on a game parameter; and
allowing the player character to help others with the game parameter if the player character did not receive help from another player character on the game parameter.

5. The method of claim 1 further comprising:
determining if a player character received help from another player character on a game parameter; and
allowing the player character to help others with the game parameter if the player character received help from another player character on the game parameter.

6. The method of claim 1 further comprising
identifying a maximum number of player characters that can complete a parameter without help.

7. The method of claim 6 further comprising:
determining if the maximum number has been reached; and
allowing a player character to complete the parameter alone if the maximum number has not been reached.

8. The method of claim 7 further comprising,
if the maximum number has not been reached, determining if a player character received help with the game parameter; and
if the player character has received help with the game parameter, allowing the player character to complete the parameter.

9. The method of claim 8 wherein if the player character did not receive help with the game parameter, preventing the player character from completing the parameter.

10. A method performed by a computer, the method comprising:

providing, by the computer, a virtual video game environment wherein a plurality of player characters interact with one another and wherein the virtual video game environment includes a plurality of game parameters that are completed by the player characters as the player characters progress through the game;

permitting, by the computer, a first player character of the plurality of player characters to post a request for help for the other players to view;

permitting, by the computer, a second player character of the plurality of player characters to accept the request for help;

permitting, by the computer, the second player character to provide help to the first player character;

determining the helpfulness of the second player character; and providing, by the computer, a benefit to the second player character based on helpfulness of the second player character.

11. The method of claim 10 wherein determining the helpfulness of the second player character comprises
determining the number of game parameters for which the player character has given help to others.

12. The method of claim 11 further comprising
providing a benefit to the second player character based on the number of parameters for which the player character has given help to other player characters.

13. A system comprising:
a computer in communication with a plurality of game devices, wherein the computer provides to the game devices a virtual game environment comprising a plurality of game parameters;
wherein each game device allows at least one respective player to access the computer,
wherein each of the players controls at least one player character and the plurality of player characters are configured to interact with the virtual game environment;
a first database in communication with the computer, wherein the first database is configured to track the helpfulness of the player characters as they interact with the virtual game environment;
a second database in communication with the computer, wherein the second database is configured to determine when a first player character has given help to a second player character; and
a third database in communication with the computer, wherein the third database is configured to determine when a first player character has received help from a second player character
in which the computer is programmed to perform the following steps:
permitting a first player character of the plurality of player characters to post a request for help for the other players to view;
permitting a second player character of the plurality of player characters to accept the request for help;
permitting the second player character to provide help to the first player character;
determining whether the first player character successfully completes a first game parameter; and
providing a benefit to the second player character based on whether the first player character successfully completes a first game parameter.

14. The system of claim 13 further comprising
a fourth database in communication with the computer, wherein the fourth database is configured to identify those game parameters for which the second player character is allowed to give help.

15. The system of claim 14 further comprising
a fifth database in communication with the computer, wherein the fifth database is configured to identify those game parameters for which the second player character is allowed to give help.

16. The system of claim 15 wherein the identity of the game parameters for which the computer permits the second player character-to give help is based, at least in part, on the game parameters which the second player character has successfully completed.

17. The system of claim 16 wherein the computer permits the second player character to give help for a given game parameter only if the second player character has successfully completed the game parameter.

18. The system of claim 16 wherein the second player character can only give help for a given game parameter if the second player character successfully completed the game parameter without receiving help from another player character.

19. The system of claim 13 in which the computer is programmed to
determine values for acts of helpfulness that occur in the game environment.

20. The system of claim 19 wherein the values are dependant upon whether the first player character who has received help successfully completes the game parameter for which the help was intended.

* * * * *